(12) United States Patent
Unno et al.

(10) Patent No.: US 6,233,027 B1
(45) Date of Patent: May 15, 2001

(54) LIQUID CRYSTAL DEVICE AND PROCESS FOR PRODUCTION THEREOF

(75) Inventors: Akira Unno, Hiratsuka; Mineto Yagyu, Sagamihara; Yuichi Hashimoto, Tokyo, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/004,030

(22) Filed: Jan. 7, 1998

(30) Foreign Application Priority Data

| Jan. 7, 1997 | (JP) | ................................... 9-000963 |
| Sep. 25, 1997 | (JP) | ................................... 9-260470 |
| Sep. 25, 1997 | (JP) | ................................... 9-260471 |
| Sep. 25, 1997 | (JP) | ................................... 9-260472 |

(51) Int. Cl.[7] .............................. G02F 1/135; G02F 1/141
(52) U.S. Cl. ............................................. 349/25; 349/133
(58) Field of Search ................................ 349/25, 128, 133, 349/184

(56) References Cited

U.S. PATENT DOCUMENTS

| 5,115,336 | * | 5/1992 | Schildkraut et al. ................. 359/263 |
| 5,128,228 | * | 7/1992 | Ueda et al. .............................. 430/59 |
| 5,153,761 | * | 10/1992 | Marlor .................................... 349/25 |
| 5,338,632 | * | 8/1994 | Hashimoto et al. .................... 430/58 |
| 5,666,217 | | 9/1997 | Kaneko et al. ....................... 349/122 |
| 5,686,019 | | 11/1997 | Nakamura ....................... 252/299.01 |
| 5,731,797 | * | 3/1998 | Akiyama et al. ....................... 345/97 |
| 5,786,118 | * | 7/1998 | Terrell et al. .......................... 430/58 |
| 5,825,447 | * | 10/1998 | Hanyu et al. ......................... 349/128 |
| 6,031,655 | * | 2/2000 | Yagyu .................................. 359/292 |

FOREIGN PATENT DOCUMENTS

| 695965 | 2/1996 | (EP) . |
| 59-216126 | 12/1984 | (JP) . |
| 03275723 | 12/1991 | (JP) . |

OTHER PUBLICATIONS

Journal of Photopolymer Science and Technology, vol. 5, No. 2 (1992), pp. 397–405.
Journal of Nippon Settsuyaki Kyokai, vol. 8, No. 3 (1972), p. 131.

* cited by examiner

Primary Examiner—William L. Sikes
Assistant Examiner—Dung Nguyen
(74) Attorney, Agent, or Firm—Fitzpatrick, Cella, Harper & Scinto

(57) ABSTRACT

A liquid crystal device includes a pair of transparent substrates disposed with a prescribed gap therebetween and each having a transparent electrode thereon, a photoelectric conversion semiconductor layer not subjected to rubbing formed on one of the pair of transparent substrates, and alignment film subjected to rubbing formed on the other of the pair of transparent substrates, an a liquid crystal disposed between the photoelectric conversion semiconductor layer and the alignment film. As the photoelectric conversion semiconductor is freed from an aligning performance, the material thereof is freed from the constraint and can be selected so as to optimize the photoelectric conversion performance.

38 Claims, 13 Drawing Sheets

LIQUID CRYSTAL DEVICE AND PROCESS FOR PRODUCTION THEREOF

FIELD OF THE INVENTION AND RELATED ART

The present invention relates to a liquid crystal device suitably used in a photo-writing type device for writing data therein by light illumination, and a process for producing such a liquid crystal device.

Hitherto, there has been proposed a photo-writing type liquid crystal device or a space light modulation for writing data therein by light illumination (hereinafter inclusively called an "SLM").

The SLM is a kind of liquid crystal device including a photoelectric conversion semiconductor layer and a liquid crystal layer and designed for writing data by illumination with writing light and reading data by illumination with readout light.

The SLM may be classified into a transmission-type one to be illuminated with readout light incident thereto from a side opposite to an observer, and a reflection-type one to be illuminated with readout light incident thereto from the side of an observer.

A transmission-type SLM is reported in Journal of Photopolymer Science and Technology, Volume 5, Number 2, 1992, pp. 397–405 and Japanese Laid-Open Patent Application (JP-A) 3-275723.

As shown in FIG. 1, such an SLM 1 includes a pair of transparent glass substrates 2 and 3 disposed with a prescribed gap therebetween and having transparent electrodes 5 and 6, respectively, of ITO (indium-tin oxide) on their inner surfaces. Further, one transparent electrode 5 is coated with a 2 μm-thick photoconductive polymer film 7 as a photoelectric conversion semiconductor layer, and the other transparent electrode 6 is coated with an alignment film 12. These substrates 2 and 3 are applied to each other with a sealant (not shown), and the gap therebetween is filled with a ferroelectric liquid crystal 9.

The above-mentioned photoconductive polymer film 7 and alignment film 12 both have been subjected to a rubbing treatment and a heat treatment at a temperature and a heat treatment at a temperature around 300° C. for crystallization.

In the SLM shown in FIG. 1, the photoconductive polymer film 7 is formed from a polyimide film forming a uniaxial alignment film through rubbing and heat treatment, so that additives, such as a charge generation substance and a charge transportation substance, have to be selected in consideration of their heat resistance and chemical resistance. Accordingly, the latitude of selection of these additives is narrow so that the sensitivity thereof are liable to be lower. Further, in case of using a chiral smectic liquid crystal having a bookshelf layer structure capable of providing a high contrast, alignment defects are liable to occur.

As a liquid crystal device different from an SLM and having no photoelectric conversion semiconductor layer, there has been known a type of display devices comprising a plurality of scanning electrodes and a plurality of data electrodes arranged so as to form an electrode matrix for multiplexing drive.

Among such liquid crystal display devices, a display device using a chiral smectic liquid crystal is promising as a high resolution display device but has been known to require a difficult technique for alignment of liquid crystal molecules without alignment defects. Particularly, a sophisticated technique is required for aligning a chiral smectic liquid crystal into a bookshelf layer structure, e.g., as disposed in U.S. application Ser. No. 08/509,929 filed on Aug. 1, 1995 and entitled "Liquid Crystal Device" (or EP-A 0695965). However, the alignment technique still cannot be said as a sufficient process for providing a liquid crystal display device having a bookshelf layer structure at a low cost and a good reproducibility. The remaining problems may include: obtaining a bookshelf layer structure free from alignment defects, obtaining good liquid crystal injection performance, and suppressing a thermal distribution generated by flowing drive currents.

SUMMARY OF THE INVENTION

Accordingly, an object of the present invention is to provide a liquid crystal device allowing a simple and inexpensive production process.

Another object of the present invention is to provide a liquid crystal device having good display quality through suppression of deterioration of display performance due to temperature change and with good alignment state.

Another object of the present invention is to provide a liquid crystal device of photo-writing type having a good sensitivity.

A further object of the present invention is to provide a liquid crystal device of photo-writing type having a good light transmissivity.

According to the present invention, there is provided a liquid crystal device comprising a pair of substrates each having a liquid crystal-contacting layer thereon, and a liquid crystal disposed between the pair of substrates, one of the liquid crystal-contacting layers comprising a photoelectric conversion semiconductor layer free from a uniaxial alignment characteristic, and the other of the liquid crystal-contacting layers comprising a uniaxial alignment film.

In a preferred embodiment, the liquid crystal comprises a chiral smectic liquid crystal aligned to assume a bookshelf layer structure.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Figure 1:
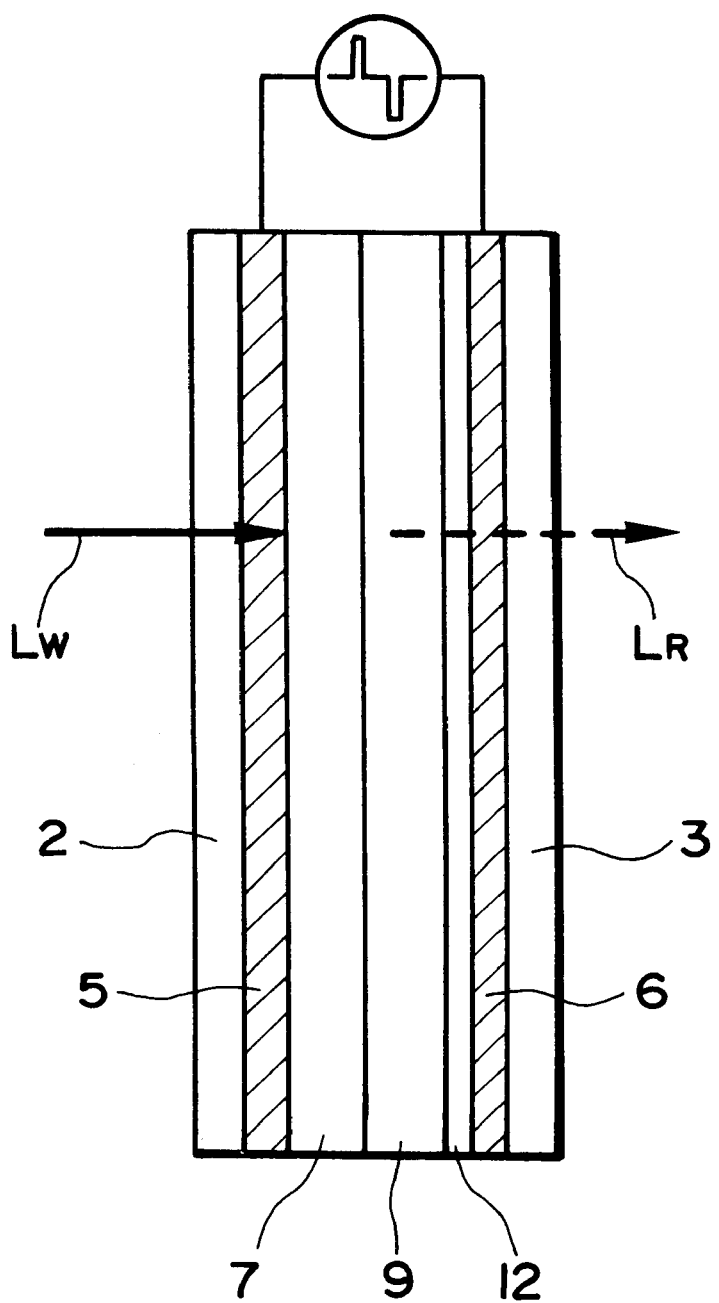
FIG. 1 is a schematic view for illustrating a structure of a liquid crystal device of prior art.

A first embodiment of the present invention will now be described with reference to FIGS. 2 and 3.

An electrooptical apparatus using a liquid crystal device according to this embodiment includes an SLM 21 comprising a photo-writing type liquid crystal device and a writing light illumination apparatus 26 so as to write data in the SMC 21 by illumination with light from the writing light illumination apparatus.

The SLM 21 includes a pair of transparent substrates 2 and 3 disposed with a prescribed gap therebetween and having transparent electrodes 5 and 6, respectively, on their inner surfaces.

One transparent electrode 5 is surface-coated with a photoelectric conversion semiconductor layer 22, and the other transparent electrode 6 is surface-coated with a uniaxial alignment film 12 having a uniaxial alignment control power.

The substrates 2 and 3 are applied to each other with a sealing member (not shown) at their edges, and the gap therebetween is filled with a liquid crystal 13. The gap between the substrates may be defined by adhesive spacers and/or non-adhesive spacers (not shown), used as desired.

On the other surfaces of the substrates 2 and 3, a pair of polarizers 30 and 31 are disposed so that their polarization directions cross each other at right angles.

The photoelectric conversion semiconductor layer 22 includes a charge generation 23 having a function of generating charge carriers (electrons and holes) in response to photo-illumination and a charge transportion layer 25 having a function of transporting the carriers at a large mobility.

A liquid crystal-contacting surface 22f of the photoelectric conversion semiconductor layer 22 has not been subjected to a uniaxial aligning treatment, such as rubbing. On the other hand, a liquid crystal-contacting surface 12f of the uniaxial alignment film 12 has been subjected to a uniaxial aligning treatment, such as rubbing.

In this instance, molecules of the liquid crystal are aligned preferentially from the uniaxial alignment film 12 side so as to form smectic layers and not preferentially from the photoelectric conversion layer 22. More specifically, the liquid crystal molecules are aligned so as to cause smectic layer growth from the surface 12f side of the uniaxial alignment film 12 to complete the layer growth at the surface 22f side of the photoelectric conversion semiconductor layer 22. Thus, a bookshelf layer structure (in a sense of including a quasi-bookshelf structure including obliquely aligned smectic layers at a layer inclination angle up to 3 deg.) with little alignment defects can be obtained.

Either of the transparent electrodes 5 and 5 need not be patterned, e.g., by photolithography. Accordingly, the liquid crystal-contacting surfaces 12f and 22f can be formed as flat surfaces, which assist the development of a good quality of bookshelf layer structure.

Further, as the liquid crystal-contacting surfaces 12f and 22f are flat, and the photoelectric conversion semiconductor layer 22 is softer than the transparent electrodes, etc. and can be formed in a larger thickness than a well-known polyimide alignment film, the liquid crystal injection can be facilitated so that the SLM can be produced in a shorter period.

(Driving method of a liquid crystal device)

Figure 2:
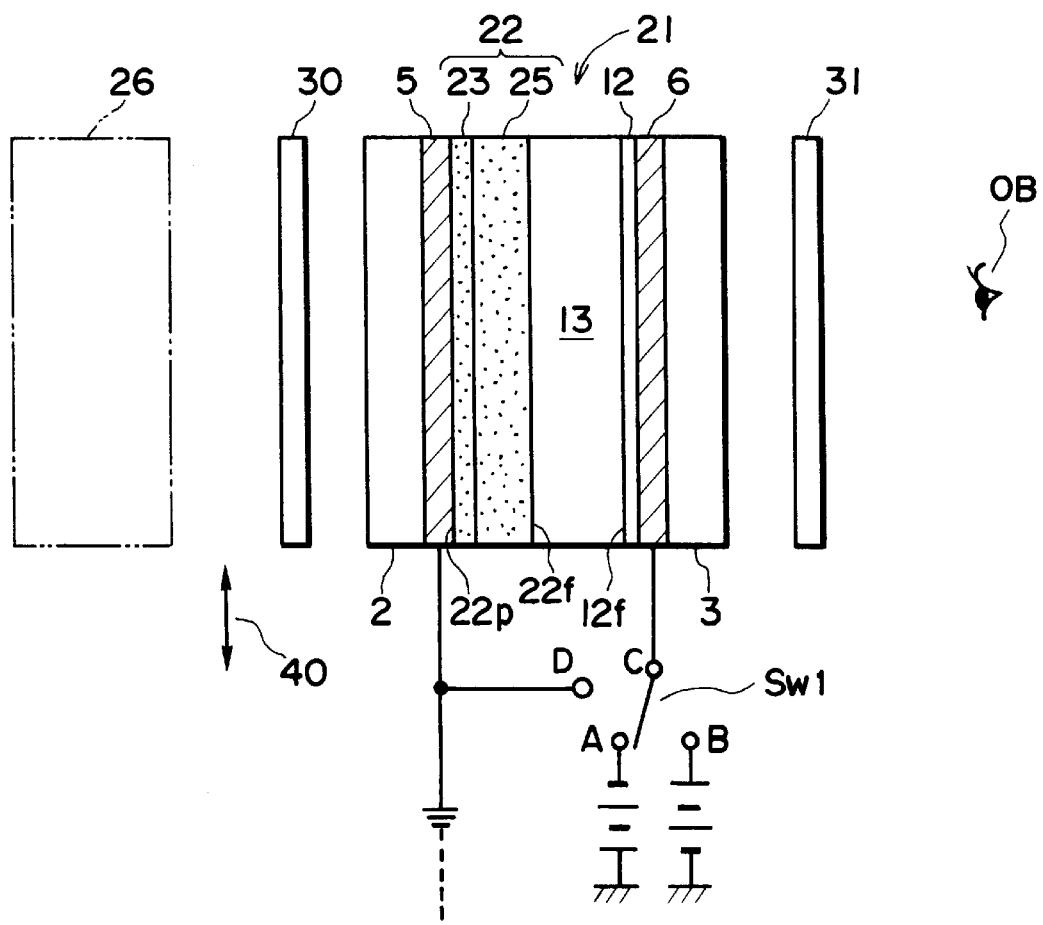
FIG. 2 is a schematic view for illustrating a structure of a liquid crystal device according to the invention.
Figure 3:
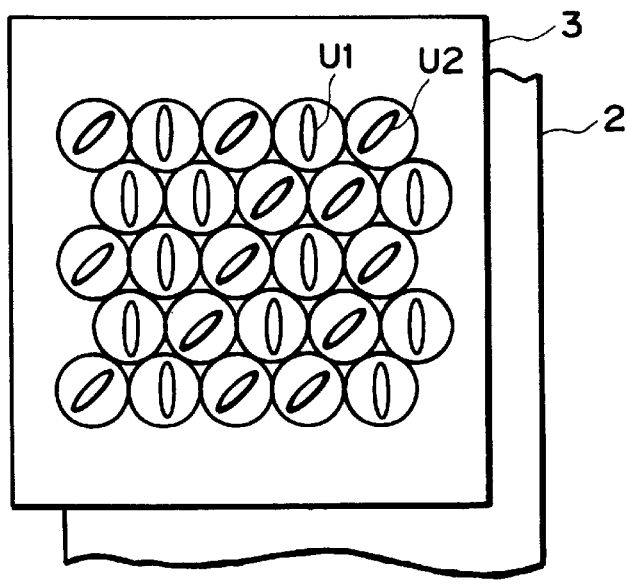
FIG. 3 is an illustration of an operation of a liquid crystal device according to the invention.

Referring to FIG. 2 a driving method for an SLM according to the present invention will be described.

A DC voltage is applied between the transparent electrodes 5 and 6 by placing the transparent electrode 5 at a reference potential and connecting terminals A and C by a switch SW1.

By actuating the light illumination apparatus 26, writing light carrying prescribed image data is caused to be incident to a light-receiving surface 22p of the photoelectric conversion layer 22 through the polarizer 30, the transparent substrate 2 and the transparent electrode 5. On receiving the writing light, the photoelectric conversion layer 22 generates charges corresponding to the received light quantity principally in the charge generation layer 23 thereof. The writing light is image data light having a planar light quantity distribution, so that a charge distribution is developed in the photo-charge generation layer 23. Among the generated charge carriers, holes are transported through the charge transportation layer 25 to the liquid crystal-contacting surface 22f. Electrons flow to the transparent electrode 5 having a relatively high potential. Accordingly, the resistivity of the photoelectric conversion layer 22 is locally lowered depending on the received light quantity, so that a higher effective voltage is applied to the liquid crystal at a portion of a larger received light quantity, and a lower effective voltage is applied to the liquid crystal 13 at a portion of a smaller received light quantity.

At a portion where the thus-applied effective voltage exceeds an inversion (switching) threshold of the liquid crystal, the liquid crystal molecules are switched from its one stable state (U1) to the other stable state (U2). The state of local switching of the liquid crystal molecules is illustrated in FIG. 3. At a portion where the effective voltage applied to the liquid crystal does not exceed the threshold, the liquid crystal molecules remain in one stable state (U1).

The planar resolution unit of the photoelectric conversion layer 22 corresponds to a unit charge and accordingly can be substantially infinitely high, but the planar resolution of the liquid crystal 13 is governed by a domain size, so that the resolution of the displayed picture is restricted by the domain size. However, a local area having a size of ca. 100 $\mu$m×100 $\mu$m can include at least 100 domains, or even 10000 or more domains in some cases. Accordingly, depending on the light quantity received by a local area concerned, the number of inverted domains can vary so as to allow a gradational display of at least 256 levels. Thus, the SLM 21 allows an analog-like gradational display by using a ferroelectric liquid crystal.

Then, the switch SW1 is turned to connect the terminals C and D, so that the transparent electrodes 5 and 6 are placed at equal potentials and the liquid crystal 13 does not receive an effective outer electric field. The liquid crystal is placed in a chiral smectic phase, so that the liquid crystal molecules retain their switched or orientation states.

Then, readout light is emitted from the light illumination apparatus 26. Similarly as the writing light, the readout light is incident to the SLM 21 through the polarizer 30 and emitted through the polarizer 31 to be recognized by an observer OB.

The writing light is designed to have an energy (and a wavelength) absorbed by the photoelectric conversion layer 22 to generate charges therein. In contrast thereto, the readout light should be designed to have an energy (wavelength) not easily absorbed by the photoelectric conversion layer 22 or have so much light quantity that cannot be completely absorbed by the photoelectric conversion layer 22.

If the polarizers 30 and 31 arranged in cross nicols are positioned so that the state U1 is non-transmissive and the state U2 is transmissive. The bright writing data provides bright readout data, and the dark writing data provides dark readout data. On the other hand, if the polarizers 30 and 31 are arranged so that the state U1 is transmissive and the state U2 is non-transmissive, the bright writing data is inverted to dark readout data and the dark writing data is inverted to bright readout data. Such inversion and non-inversion of light data can be also performed by changing the polarity of the applied voltage.

In order to repeat the above-described operation, after the operation, the switch SW1 is turned to connect the terminals B and C to apply a sufficiently large reverse electric field to the liquid crystal. By such reset operation, the liquid crystal of the SLM is wholly placed in the state U1. In this instance, if reset light having no planar light quantity distribution is used to illuminate the SLM 21, the liquid crystal can be reset to the state U1 at a relatively low reverse electric field.

The SLM 21 according to this embodiment utilizes a memory characteristic of a ferroelectric liquid crystal to effect a display, and can also be driven by a drive scheme as disclosed in JP-A 59-216126 (inventor: Shuzo Kaneko).

(Substrate)

The substrates 2 and 3 used in the present invention may be flexible or non-flexible substrates comprising an inorganic material, such a glass, quartz or alumina, or an organic material, such as a plastic film. It is also possible to use a combination of a rigid substrate and a flexible substrate.

The polarizer 30 can be applied to the substrate 2, and the polarizer 31 can be applied to the substrate 3 so as to provide integral members.

(Transparent electrode)

The transparent electrodes 5 and 6 used in the present invention may suitably comprise a transparent conductive oxide, such as tin oxide, indium oxide, indium tin oxide (ITO), zinc oxide or iridium oxide.

(Uniaxial alignment film)

The uniaxial alignment film 12 may comprise an inorganic alignment film, such as obliquely deposited silicon oxide, or an organic alignment film such as rubbed polyimide or polyamide film. Further, a uniaxial alignment film as disposed in the above-mentioned U.S. application Ser. No. 08/509,929 may also be suitably used.

(Photoelectric conversion layer)

The photoelectric conversion layer 22 used in the present invention may comprise a laminate photoconductor layer functionally separated into a charge generation layer 23 and a charge transport layer 25 as shown in FIG. 2, or may comprise a single photoconductor layer containing a charge generation substance and a charge transporting substance mixed together with a resin.

In the laminate structure shown in FIG. 2, the charge generation layer 23 is disposed in contact with the transparent electrode 5 and the charge transportation layer 25 is disposed in contact with the liquid crystal 13. It is however also possible that the charge transportation layer 25 contacts the transparent electrode 5 and the charge generation layer 23 contacts the liquid crystal 13.

<Charge generation layer>

The charge generation layer 23 may comprise a photoconductor substance (charge generation substance) in particulate form dispersed in a resin. Examples of the photoconductor substance (charge generation substance) may include: compounds having an electron-donating site and an electron-accepting cite in their molecules; azo pigments, such as Sudan Red and Dian Blue; quinone pigments, such as pyrene-quinone and anthanthrone; indigo pigments, such as indigo and thioindigo; azulenium pigments; and phthalocyanine pigments, such as copper phthalocyanine, and titanylphthalocyanine. Examples of the binder resin for dispersing such a particulate photoconductor substance may include: polyvinyl butyral, polystyrene, polyvinyl acetate, acrylic resin, polyvinyl-pyrrolidone, ethyl cellulose, and cellulose acetate lactate. The charge generation layer may suitably be formed in a thickness of ca. 0.01–2.0 μm, preferably ca. 0.01–0.2 μm.

<Charge transport layer>

The charge transport layer may comprise a solution of a charge transporting substance having a large carrier mobility in a film-forming resin. Examples of the charge-transporting substance may include: polycyclic aromatic compounds including a structure of biphenylene, anthracene, pyrene or phenanthrene in their main or side chains; nitrogen-containing heterocyclic compounds, such as indole, carbazole, oxadiazole and pyrazoline; hydrazone compounds, and styryl compounds. Examples of the film-forming resin may include: polyesters, polycarbonates, polymethacrylates, polystyrene, and polyamides.

Incidentally, in case where a spacer is disposed in contact with the charge transport layer 25 so as to provide a uniform thickness of liquid crystal layer 13 in the SLM, it is preferred that the charge transport layer 25 is formed to have a pencil hardness of 2B or harder so as to control the gap size accurately. The charge transport layer 25 may preferably be formed in a thickness of ca. 0.1–1.8 μm, and the photoelectric conversion layer 22 may have a surface energy of at most 30 dyn/cm$^2$ on its surface contacting the liquid crystal 13.

It is possible to insert an intermediate layer between the transparent electrode 5 and the photoelectric conversion layer 22 so as to provide an improved adhesion between the transparent electrode 5 and the photoelectric conversion layer 22 or prevent excessive charge injection from the transparent electrode 5. Such an intermediate layer may be called an adhesion layer or a charge injection prevention layer. The intermediate layer may be composed of a single layer or a plurality of layers.

The intermediate layer even if formed in a plurality of layers may suitably have a thickness of at most 5 μm, preferably at most 1.0 μm, further preferably at most 0.5 μm. Such an intermediate layer may be formed of, e.g., casein, polyvinyl alcohol, nitrocellulose, polyamide (nylon 6, nylon 66, nylon 610, copolymer nylon, N-alkoxymethylated nylon, etc.), polyurethane, polyester, or phenolic resin.

Now, specific examples of the photoelectric conversion layer will be described. A photoelectric conversion layer formed by using an azo pigment or an i-form titanylphthalocyanine will provide an improved transmittance and a good transmission characteristic over a visible region (all wavelengths).

Figure 4:
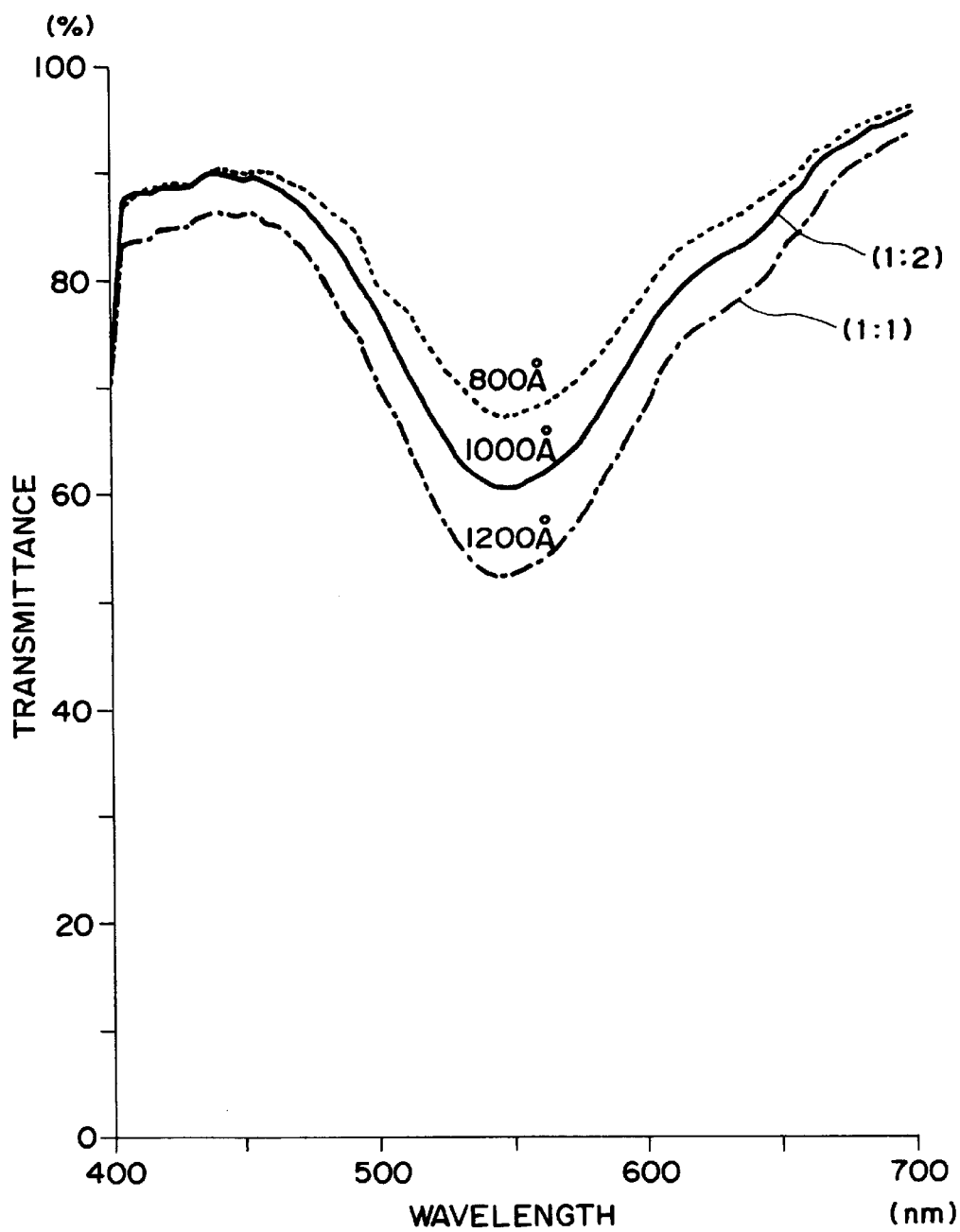
FIGS. 4–7 are respectively a graph showing a spectral transmittance characteristic of an organic semiconductor layer according to the invention.
Figure 5:
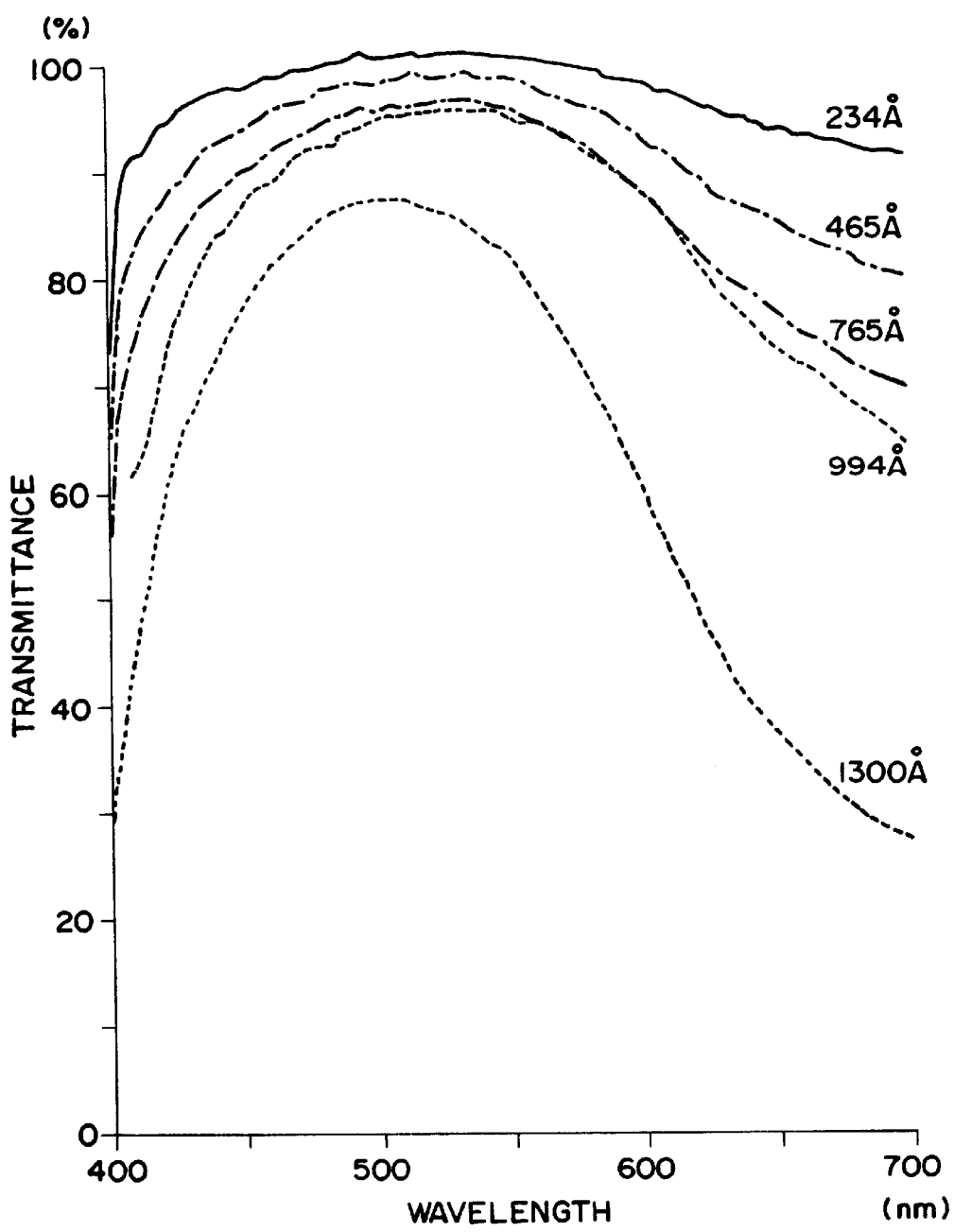

FIG. 4 shows transmission characteristics of laminate photoelectric conversion layers, each including a charge generation layer 23 containing an azo pigment and a charge transport layer 25 containing a hydrazone compound, respectively exhibiting a sufficient transmittance of at least 50% at a wavelength of ca. 550 nm. FIG. 5 shows transmission characteristics of laminate photoelectric conversion layers, each including a charge generation layer 23 containing i-form titanylphthalocyanine and a charge transport layer 25 containing a hydrazone compound, respectively exhibiting a sufficient transmittance of at least 40% over wavelengths of 400–700 nm. Further, FIG. 6 shows transmission characteristics of mixture-type photoelectric conversion layers using an azo pigment, and FIG. 7 shows a transmission characteristics of mixture-type photoelectric conversion layers using an i-form titanylphthalocyanine, respectively showing transmittances of at least 40%.

More specifically, FIG. 4 shows transmission characteristics of three types of laminate photoelectric conversion layers, each including a charge generation layer formed by applying a coating liquid comprising 4 wt. parts of an azo pigment, 2 wt. parts of benzal resin, 34 wt. parts of cyclohexanone and 64 wt. parts of butanol by spin coating into a dry thickness of one of 800 Å, 1000 Å and 2000 Å, and a 0.8 $\mu$m-thick charge transport layer formed by application of a coating liquid comprising 10 wt. parts of a hydrazone compound, 10 wt. parts of bisphenol Z-type polycarbonate, 40 wt. parts of dichloromethane and 20 wt. parts of monochlorobenzene.

FIG. 5 shows transmission characteristics of 5 types of laminate photoelectric conversion layers, each including a charge generation layer formed by applying a coating liquid comprising 4 wt. parts of titanyl phthalocyanine, 8 wt. parts of polyester resin, 2 wt. parts of melamine resin and 100 wt. parts of cyclohexanone by spin coating into a dry thickness of one of 234 Å, 465 Å, 765 Å, 994 Å and 1300 Å, and a 0.8 $\mu$-thick charge transport layer identical to the one used in FIG. 4 described above.

Figure 6:
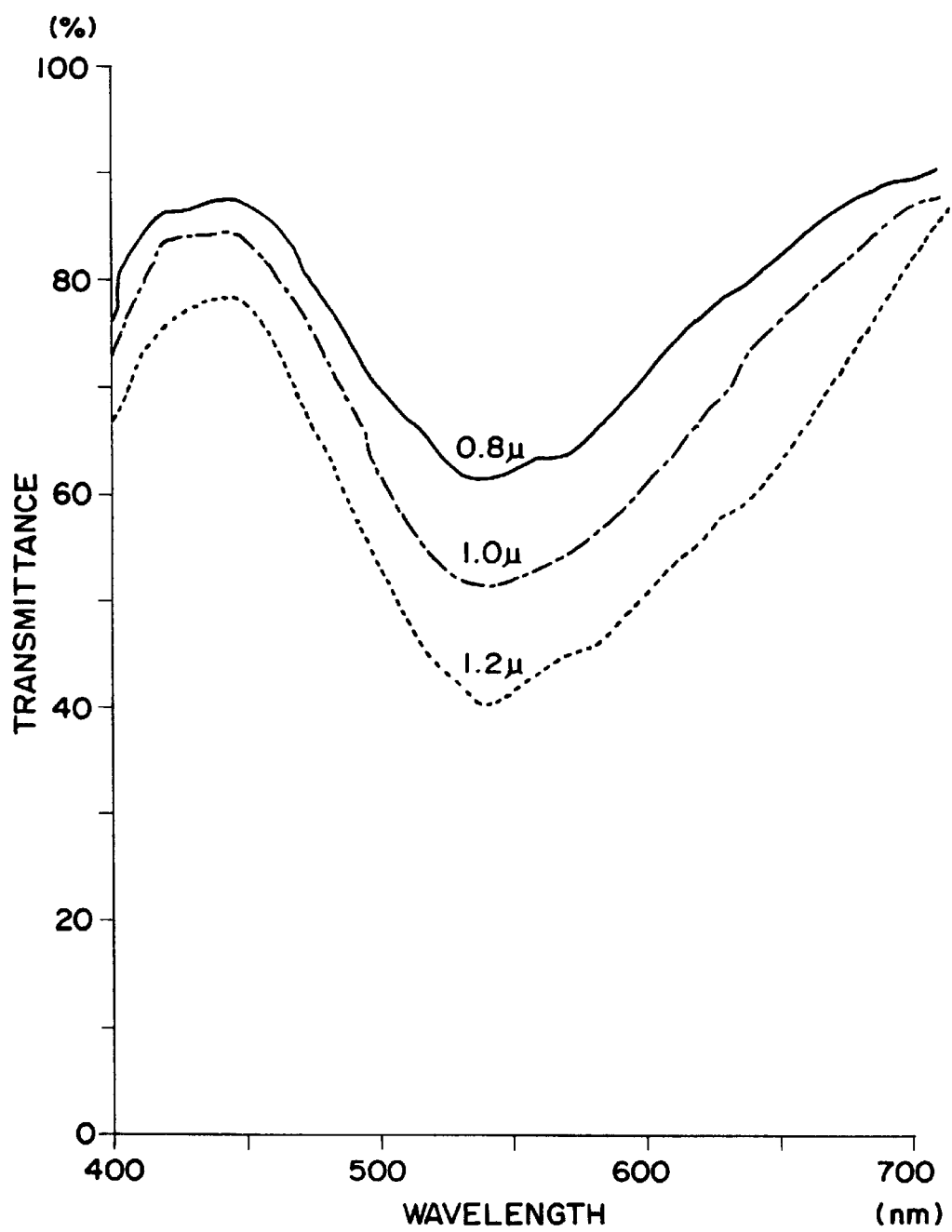
Figure 7:
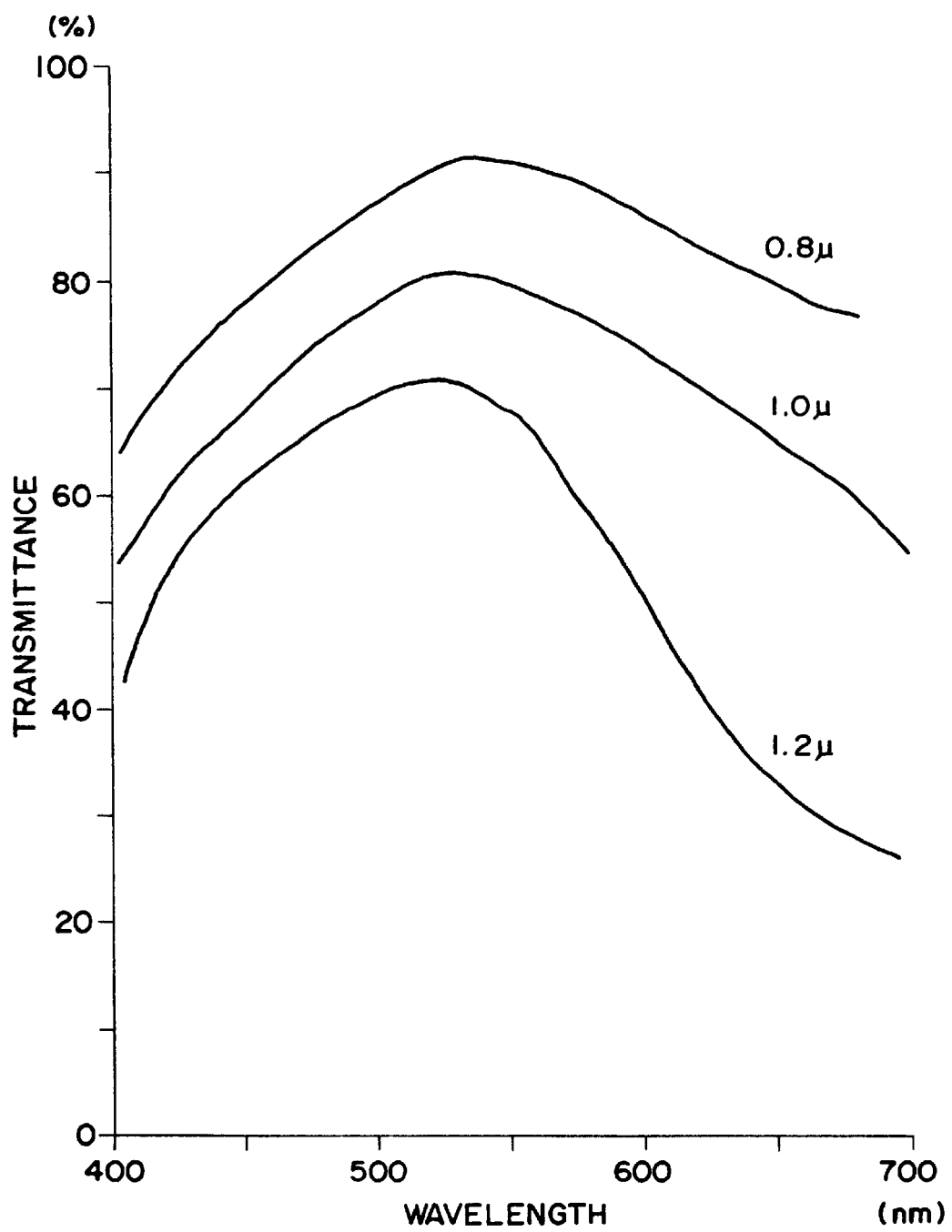

FIG. 6 (or FIG. 7) shows transmission characteristics of three types of mixture-types photoelectric conversion layers formed in different thicknesses of 0.8 $\mu$m, 1.0 $\mu$m and 1.2 $\mu$, respectively, and each formed by spin-coating of a composition comprising 5 wt. parts of azo pigment (or titanyl phthalocyanine), 5 wt. parts of hydrazone compound, 10 wt. parts of bisphenol Z-type polycarbonate, 40 wt. parts of monochlorobenzene and 80 wt. parts of dichloromethane.

As shown in FIGS. 4–7, the transmission characteristic is substantially changed depending on the photoelectric conversion layer thickness, so that the thickness should be appropriately selected so as to provide an appropriate transmission characteristic.

If the photoelectric conversion layer is formed in a thickness of at most 2 $\mu$m, preferably at most 1 $\mu$m, it is possible to provide a higher resolution.

Table 1 shown below lists resolutions obtained by using 4 types of photoelectric conversion layers formed in thicknesses of 1 $\mu$m, 2 $\mu$m, 3 $\mu$m and 4 $\mu$m with or without a 0.2 $\mu$m-thick intermediate polysiloxane layer, in terms of discriminable number of lines/mm for a transferred image by using a Cr mask. More specifically, the 4 types of photoelectric conversion layers each included a 0.1 $\mu$m-thick charge generation layer containing an azo pigment as a charge-generating substance and one of 4 charge transport layers formed in thicknesses of 0.9 $\mu$m, 1.9 $\mu$m, 2.9 $\mu$m and 3.9 $\mu$m, respectively, and each containing a hydrazone compound as a charge-transporting substance. As shown in Table 1 below, a thinner photoelectric conversion layer without an intermediate layer provides a higher resolution.

TABLE 1

(Photoelectric conversion layer thickness vs. resolution)

| Thickness ($\mu$m) | Intermediate layer ($\mu$m) | Resolution (lines/mm) |
| --- | --- | --- |
| 1.0 | none | 150 |
| 2.0 | none | 130 |
| 3.0 | none | 100 |
| 4.0 | none | 60 |
| 1.0 | 0.2 | 120 |
| 2.0 | 0.2 | 100 |
| 3.0 | 0.2 | 80 |
| 4.0 | 0.2 | 30 |

In the above-described embodiment, written data is displayed by illumination with readout light but can be readout by scanning with laser light or by using a CCD.

In case of repeatedly writing different data, writing light quantity should be suppressed to a level of not causing photomemory of the photoelectric conversion layer 22. Alternatively, in case of memorizing an image for a long period, a writing light quantity may be increased to a level causing photomemory.

Tables 2 and 3 shown below indicate relationships between light quantity and photomemory. More specifically, Table 2 shows the results obtained in the case of using laser light as writing light for a photoelectric conversion layer containing i-form titanyl phthalocyanine, and Table 9 shows the results obtained in the case of using analog light as writing light for a photoelectric conversion layer containing an azo pigment. In either case, a hydrazone compound was used as the charge transporting substance.

TABLE 2

| Run No. | Light quantity | Photo-memory | Possibility of repetitive use |
| --- | --- | --- | --- |
| 1 | 0.3 mW/cm$^2$ | none | possible |
| 2 | 1.5 mW/cm$^2$ | none | possible |
| 3 | 3.0 mW/cm$^2$ | none | possible |
| 4 | 30 mW/cm$^2$ | none | possible |
| 5 | 150 mW/cm$^2$ | remarkable | not possible |

TABLE 3

| Run No. | Light quantity (lux.sec) | Photo-memory | Possibility of repetitive use |
| --- | --- | --- | --- |
| 1 | 100 | none | possible |
| 2 | 300 | none | possible |
| 3 | 1000 | slight | possible |
| 4 | 3000 | slight | possible |
| 5 | 9000 | remarkable | not possible |

In order to provide a good contrast, the photoelectric conversion layer may desirably be designed so as to satisfy a condition of $0.1 \leq |V_M/V_D| \leq 1.0$ for $A \times T \geq 1 \times 10^4$ [lux.sec], wherein A [lux]: illumination light intensity, T [sec]: illumination time, $V_D$ [V]: a potential at a non-illuminated portion of the photoelectric conversion layer, and $V_M$ [V]: a potential difference between a non-illuminated portion and an illuminated portion of the photoelectric conversion layer.

If the above condition is satisfied, the writing in the photoelectric conversion layer with light data and the data writing in the liquid crystal layer by voltage application can be independently performed, so that the handling of the SLM becomes easier.

Further, in the case of data writing by light illumination, a beam from a laser or LED may be modulated by digital image signals from a computer or a scanner so as to illuminate the SLM with the modulated beam to effect photo-writing in the form of dots or spots in some cases. For such dot-form photo-writing, the spot exposure may be performed by pulse exposure at a luminance of 1–5 mW for a dot of 20–100 μm with a Gaussian luminance distribution.

Figure 8A:
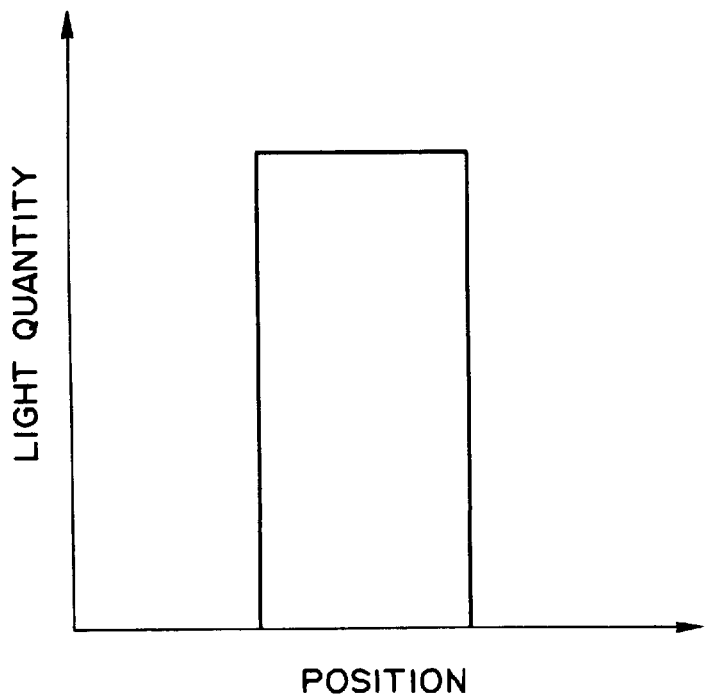
FIGS. 8A–8B are graphs showing exposure light quantity distributions in a digital exposure system.
Figure 8B:
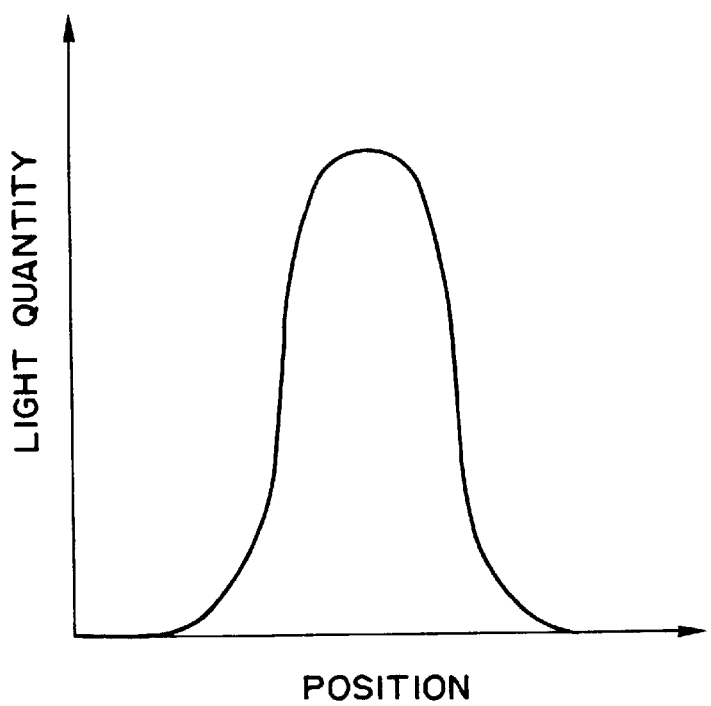

Thus, the dot exposure quantity distribution is not an ideal square one as shown in FIG. 8A but a moderate distribution as shown in FIG. 8B, thus being liable to result in a dot image having a poor resolution.

In order to solve the problem, it is preferred to design the photoelectric conversion layer so as to provide a maximum in a differential coefficient (Δ potential/Δ light quantity)-light quantity characteristic of a photo-attenuation performance curve. More specifically, it is preferred to provide a differential coefficient of at least 3, more preferably at least 5, as calculated from a normalized photo-attenuation curve of the photoelectric conversion layer.

Figure 14:
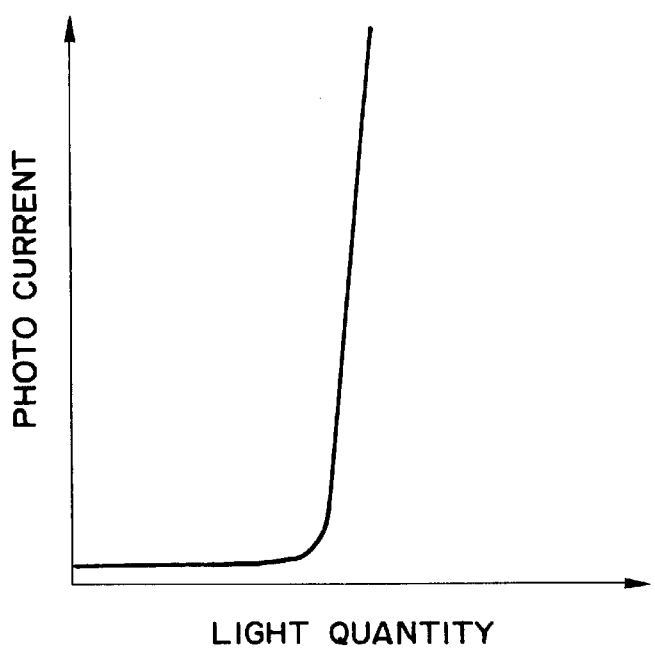
FIGS. 14 and 15 are graphs each showing a characteristic of a photo-electric conversion layer used in a liquid crystal device according to another embodiment of the invention.
Figure 15:
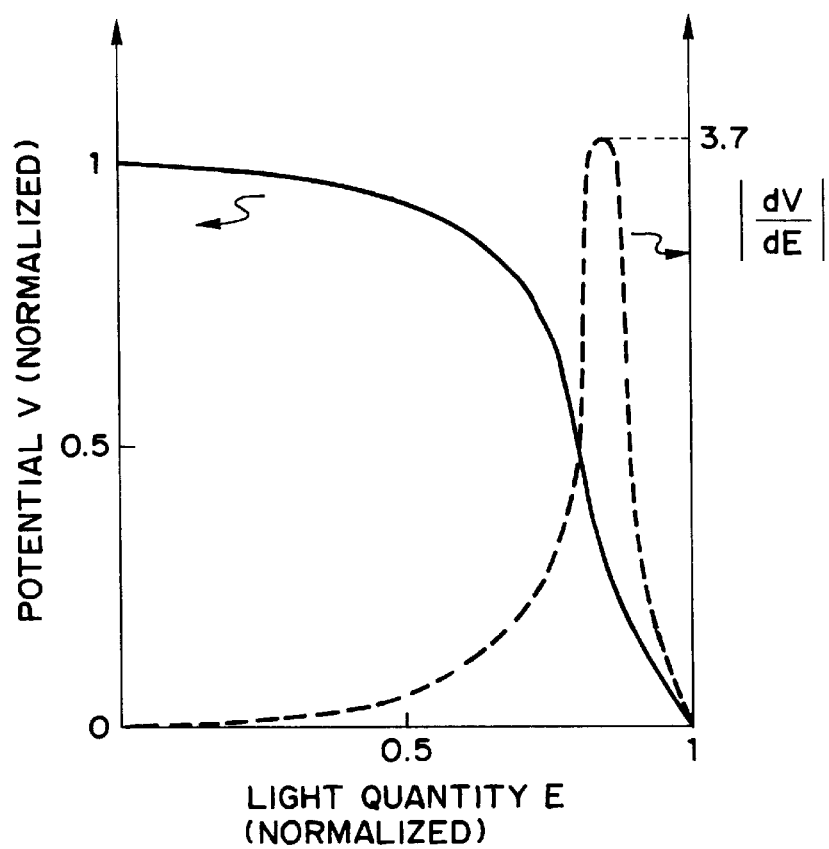

When such a photoelectric conversion layer is illuminated with dot-form light, a photo-current flows due to a photo-carrier avalanche phenomenon to cause a change in liquid crystal orientation state, thereby effecting a high-resolution data writing. Thus, the photoelectric conversion layer used in the present invention may have photoelectric conversion characteristic as shown in FIG. 14 that a photo-current does not flow at a low level of light quantity but abruptly flows at a light quantity exceeding a certain level, thus giving a maximum in a photo-attenuation curve as shown in FIG. 15. Such a photoelectric conversion layer may be said to have a high γ photo-attenuation characteristic.

More specifically, such a high γ photo-attenuation photoelectric conversion layer provides a photo-attenuation curve wherein the differential of a potential V (normalized) with respect to a light quantity E as an operation parameter (normalized) to provide a differential coefficient $|\Delta V/\Delta E|$ (absolute value) which initially is a relatively small value including 0, then steeply increases, passes through a maximum and is again converged to 0 as shown in FIG. 15.

In case where a photoelectric conversion layer 22 having such a characteristic is used in an SLM and dot-form photowriting is performed at a luminance of 1–5 mW and a very narrow pulse width of 100 μm or below, a sharp dot image (written data) close to the one shown in FIG. 8A may be formed in the photoelectric conversion layer 22, which is suitable for data writing according to a digital scheme.

As described above, if a high γ photo-attenuation photoelectric conversion layer having an avalanche effect is combined with a writing light emission apparatus for image processing according to the digital scheme, it becomes possible to effect high-resolution data writing with an excellent dot reproducibility.

The problem described with reference to FIGS. 8A and 8B may also be solved by an SLM (photo-writing type liquid crystal device) for data writing by light illumination, comprising: a pair of transparent substrates disposed with a prescribed gap therebetween and each having a transparent electrode thereon, a photoconductor layer not subjected to rubbing formed on one transparent substrate, an alignment film subjected to rubbing formed on the other transparent substrate, and a liquid crystal disposed between the pair of substrates; said photoconductor layer having a function separation-type structure including a charge generation layer having a capacitance $C_{CGL}$ and a charge transport layer having a capacitance $C_{CTL}$ providing a ratio $C_{CTL}/C_{CGL} \geq 1.0$.

In order to provide the photoconductor with a sufficient withstand voltage for liquid crystal display, the $C_{CTL}/C_{CGL}$ ratio may preferably be 2.5 or larger, further preferably 5.0 or larger.

When an SLM according to this embodiment is photo-illuminated, a photo-current flows through the photoconductor layer including a charge generation layer having a capacitance $C_{CGL}$ and a capacitance $C_{CTL}$ and a charge transport layer having a capacitance $C_{CTL}$ giving a ratio $C_{CTL}/C_{CGL} \geq 1.0$, due to the avalanche effect, thereby changing orientation state of the liquid crystal to effect a high-resolution data writing.

Suitable examples of charge generating substance to be contained in the charge generation layer may include: azo pigments of, e.g., mono-azo, bis-azo and tris-azo types; phthalocyanine pigments, such as metal phthalocyanines and non-metallic phthalocyanines; indigo pigments, such as indigo and thioindigo; polycyclic quinone pigments, such as anthanthrone and pyrenequinone; perylene pigments, such as perylene carboxylic anhydride and perylene carboxylic acid imide; squalium dyes; polypyrrole pigments; and triphenylmethane dyes. Further examples may include: various crystal forms of Se, Se—As, CdS, crystalline Si, and a-Si. Among these, azo pigments giving a broad latitude of material selection are preferred, including a particularly preferred class of compounds represented by the following formula:

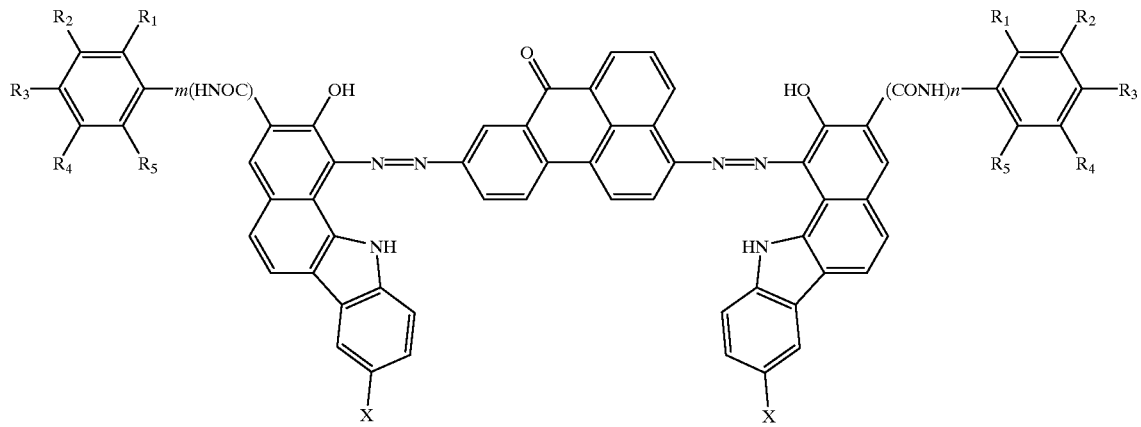

wherein X denotes a hydrogen atom or a halogen atom, such as fluorine, chlorine or bromine; $R_1$, $R_2$, $R_3$, $R_4$ and $R_5$ independently denote a hydrogen atom, a fluorine atom, such as fluorine, chlorine or bromine, nitro group, cyano group or alkyl group, such as methyl, ethyl, n-propyl, iso-propyl or butyl; alkoxy group, such as methoxy, ethoxy, or propoxy; aralkyl group, such as benzyl or phenethyl; aryl group, such as phenyl or naphthyl; or alkylamino group, such as dimethylamino or diethylamino, each capable of having a substituent; m and n independently denote 1 or 2. Examples of the above-mentioned substituent may include: halogen atoms, such as fluorine, chlorine and bromine; nitro group, cyano group; alkyl groups, such as methyl, ethyl, n-propyl, iso-propyl and butyl; alkoxy groups, such as methoxy, ethoxy and propoxy; aralkyl group, such as benzyl and phenethyl; aryl groups, such as phenyl and naphthyl; and alkylamino group, such as dimethylamino and diethylamino.

The above-mentioned charge generation substance may be dispersed in an appropriate solvent of a binder resin, and the resultant solution may be applied and dried to provide a charge generation layer. Examples of the binder resins may include: polyvinyl acetal, polystyrene, polyesters, polyvinyl acetate, methacrylic resins, acrylic resins, polyvinylpyrrolidone and cellulose resin, and resins obtained by imparting a hole-transporting characteristic or an electron-transporting characteristic to such resins. The resultant charge generation layer may preferably have a thickness of 0.01–2.0 μm, particularly 0.1–1.8 μm. The charge generation substance (P) and the binder resin (B) may preferably be used in a P/B weight ratio of 4/1–1/10.

On the other hand, the charge transport layer may be formed by applying and drying a solution obtained by dissolving a charge transporting substance in a solution of a film-forming resin. The charge transporting substance may be classified into an electron-transporting substance and a hole-transporting substance. Examples of the electron-transporting substance may include: electron-accepting substances, such as 2,4,7-trinitrofluorenone, 2,4,5,7-tetranitrofluorenone, chloranyl, tetracyanoquinodimethane, and alkyl-substituted diphenoquinone, and polymerized products of such electron-accepting substances. Examples of the hole-transporting substance may include: polycyclic aromatic compounds, such as pyrene and anthracene; heterocyclic compounds, such as carbazole, indole, oxazole, thiazole, oxadiazole, pyrazole, pyrazoline, thiadiazole and triazole; hydrazone compounds, such as p-diethylaminobenzaldehyde-N,N-diphenylhydrazone and N,N-diphenylhydrazino-3-methylidene-9-ethylcarbazole; styryl compounds, such as α-phenyl-4'-N,N-diphenyl-aminostilbene, and 5-[4-(di-p-tolylamino)-benzylidene]-5H-dibenzo[a,d]cycloheptane; benzidine compounds, triarylmethane compounds; triarylamine compounds, such as triphenylamine and tritolylamine; and polymers having units of the above-described compounds in their main chains or side chains, such as poly-N-vinylcarbazole and polyvinylanthracene.

Examples of the film-forming resin may include: polyesters, polycarbonates, polymethacrylates, and polystyrenes.

The charge transport layer may preferably be formed in a thickness of at most 1.0 μm, preferably 0.2 μm or smaller.

The liquid crystal-containing surface of the photoconductor layer 22 contacting the liquid crystal 13 may preferably have a surface energy of at most 30 dyn/cm$^2$.

In the present invention, by using a photoconductor layer 22 including a charge generation layer 23 having a capacitance $C_{CGL}$ and a charge transport layer 25 having a capacitance $C_{CTL}$ providing a ratio $C_{CTL}/C_{CGL} \geq 1.0$, the photoconductor layer may be provided with a photoelectric conversion characteristic based on photocarrier avalanche effect as shown in FIG. 14 such that a photocurrent does not flow at a low light quantity level but flows abruptly above a certain light quantity level. Based on the photocurrent, the liquid crystal orientation state is changed to effect a high resolution data writing.

The $C_{CTL}/C_{CGL}$ ratio may preferably be 2.5 or larger, further preferably 5.0 or larger so as to provide a sufficient withstand voltage for liquid crystal display to the photoconductor layer 22. In the present invention, the capacitances $C_{CGL}$ and $C_{CTL}$ have been calculated from the respective layer thicknesses ($d_{CGL}$ and $d_{CTL}$ and dielectric constants ($\epsilon$) obtained at a frequency of at least 1 kHz.

The ratio $C_{CTL}/C_{CGL}$ is greatly affected by the values of dielectric constants of the respective layers, which in turn are greatly affected by the dielectric constants of the charge generating substance (P) and the binder resin (B), the weight ratio therebetween, and the layer thickness. Accordingly, the optimum selection of these factors is an important factor of the present invention.

(Liquid crystal)

The liquid crystal used in the present invention may suitably be a chiral smectic liquid crystal assuming chiral smectic phase, particularly a chiral smectic liquid crystal showing ferroelectricity. A liquid crystal having a phase transition series not including cholesteric phase is suitable. A chiral smectic liquid crystal placed in a bookshelf layer structure or a quasi-bookshelf structure having a layer inclination close to that of the bookshelf (i.e., 0–3 deg.) may also be suitably used.

Such a liquid crystal assuming a bookshelf layer structure or a quasi-bookshelf layer structure may suitably be formed by using a liquid crystal material containing a fluorine-containing mesomorphic compound having a fluorocarbon terminal chain and a hydrocarbon terminal chain connected with a central skeleton and assuming a smectic mesophase or a latent smectic mesophase.

It is also possible to use a ferroelectric polymeric liquid crystal or a liquid crystal disclosed in U.S. patent application. Ser. No. 08/283,141 field on Aug. 1, 1994 and entitled "Liquid Crystal Device".

(Light illumination apparatus)

The light illumination apparatus 26 used in the present invention may suitably be an imaging or focusing apparatus, such as a camera, a projector or a film scanner, a laser beam scanner, or an image forming apparatus, such as a CRT or an LED array.

The imaging apparatus may include an apparatus for focusing reflected light from an objective onto an SLM, and an apparatus for focusing light having passed through an image-bearing member such as a negative film. In the case of using an optical shutter or an electrical shutter as used in an ordinary camera, the photoconductor layer 22 substitutes for a film.

The image forming apparatus may be used to form a latent image in the photoelectric conversion layer of the SLM by scanning with a laser beam, etc.

In the case of image formation by using a laser beam, a laser, such as an argon laser (514.48 nm), a helium-neon laser (633 nm) or a semiconductor laser (780 nm, 810 nm, etc.) may be used as a light source, and the photoelectric conversion layer of the SLM may be exposed by scanning with a laser beam corresponding to image signals, character signals, code signals or line image signals.

An analog recording, such as that of a picture image, may be performed by light intensity modulation of laser light, and a digital recording, such as that of characters, code and line images, may be performed by ON-OFF control of laser light. In the case of forming image with (halftone) dots, laser light may be subjected to ON-OFF control by a dot generator.

(Liquid crystal device production process)

Now, a process for producing a liquid crystal device according to the present invention will be described.

Figure 9A:
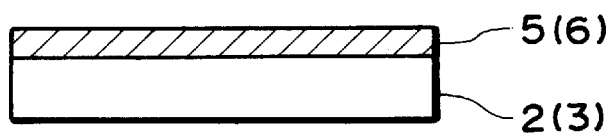
FIGS. 9A–9D are sectional views for illustrating a process for producing a liquid crystal device according to the invention.

Two substrates (2 and 3) of glass, quartz, plastic film, etc., are provided, and surface-coated with a transparent conductor film of, ITO, etc., in an appropriately selected in the range of ordinarily 10 nm–1 $\mu$m. Alternatively, a single mother board provided with a transparent conductor film may be cut into such two substrates provided with a transparent electrode. Anyway, two substrates 2 and 3 provided with a transparent electrode 5 (or 6) as shown in FIG. 9A are provided.

Figure 9B:
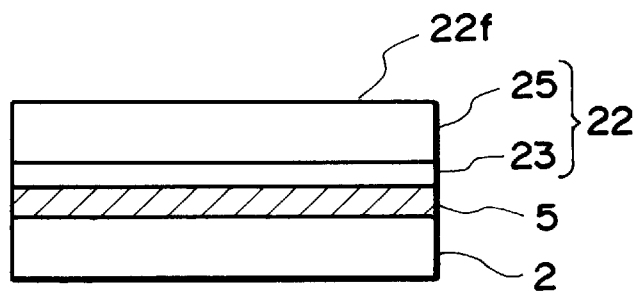

Then, as shown in FIG. 9B, one substrate 2 provided with the transparent electrode 5 is further coated with a charge generation layer 23 and a charge transport layer 25 to form a photoelectric conversion layer 22 (photoelectric conversion layer-formation step). The layers 23 and 25 may be formed by applying coating liquids formed by dispersing or dissolving a charge generating substance and a charge transporting substance, respectively, together with a film-forming resin in an appropriate solvent by spin coating, roller coating, dipping, casting, spraying, beam coating, blade coating, wire bar coating, etc. Instead of using a coating liquid as mentioned above, the charge transport layer may be formed by direct deposition of one or more species of photoconductor substance, by vacuum evaporation, sputtering, chemical vapor deposition (CVD), ion plating, etc.

The thus-formed polyelectric conversion layer 22 is provided with a surface 22f not subjected to a uniaxial aligning treatment, such as rubbing.

Figure 9C:
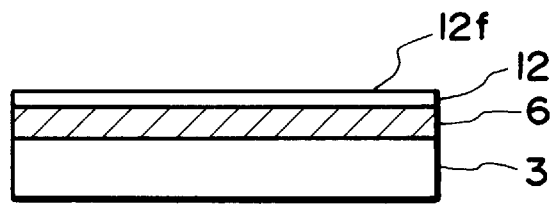

As shown in FIG. 9C, the other substrate 3 provided with the transparent electrode 6 is coated with an alignment film 12 subjected to a uniaxial aligning treatment, such as rubbing.

Then, onto a peripheral portion except for a portion forming a liquid crystal injection port of at least one of the substrates 2 and 3, a sealing agent is applied, and the substrates 2 and 3 are applied to each other, followed by curing of the sealing agent to forma blank device structure (cell). In this instance, it is also possible and preferred in some cases to dispersively dispose a non-adhesive spacer and/or adhesive spacer, as desired, in a region surrounded by the peripheral portion and providing an image display region. In this case, it is preferred to dispose such spacers on the photoelectric conversion layer and then apply the substrates each other to form a cell.

Then, the blank cell is placed under vacuum or normal pressure to inject the liquid crystal heated to isotropic phase through the injection port to a space between the substrates. Then, the liquid crystal is gradually cooled into its chiral smectic phase. The cooling speed may preferably be at most 1 ° C./min at least in the vicinity of a transition point from isotropic phase to smectic A phase.

Figure 9D:
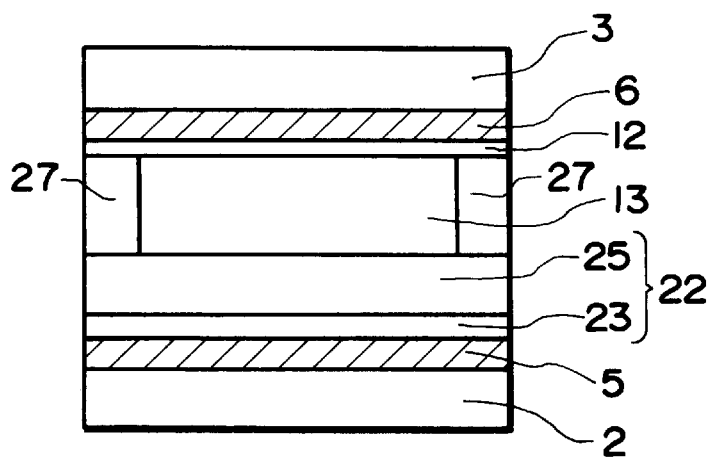

The transition of liquid crystal molecules into smectic phase may be caused preferentially from the surface 12f of the uniaxial alignment film 12f rather than from the surface 22f of the photoelectric conversion layer 22, whereby the liquid crystal 13 provides a good bookshelf layer structure with little alignment defect while being confined in a space surrounded by the cured sealing agent 27 a shown in FIG. 9D.

Incidentally, the sealing agent 27 can also be applied directly onto a glass substrate or onto an electrode surface after removing a portion of at least one of the photoelectric conversion layer 22, the alignment film 12 and the transparent electrode. In this case, a more strong adhesion force can be attained.

Hereinabove, a basic structure of SLM according to an embodiment of the present invention has been described, but the SLM can be provided with additional function or means.

Figure 10:
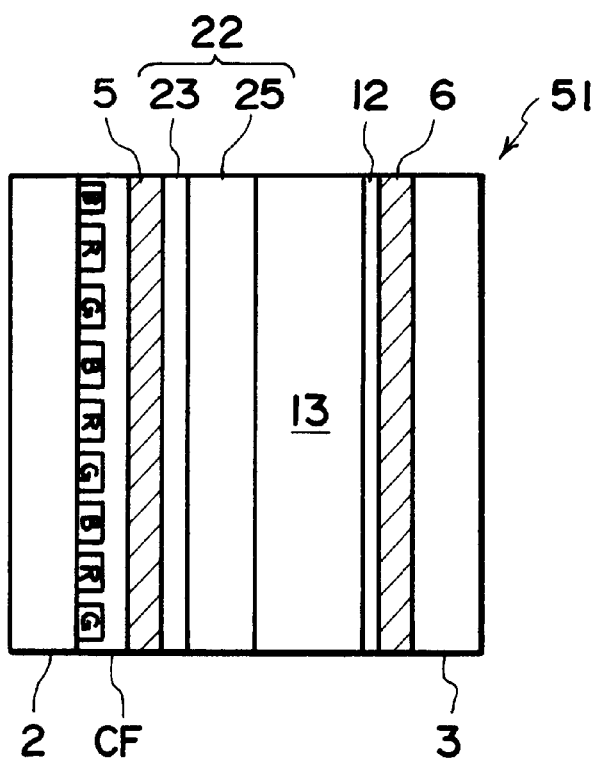
FIGS. 10 and 11 are respectively a schematic view for illustrating a structure of another embodiment of the liquid crystal device according to the invention.

FIG. 10 is a sectional view of an SLM according to another embodiment. An SLM 51 according to this embodiment includes a color filter CF between a substrate 2 and a transparent electrode 5. The color filter CF comprises a colored layer including patterns, such as stripes or mosaic segments, of three colors R, G and B, and a transparent layer for protecting and smoothening the patterned colored layer. In this embodiment, it is preferred to form a charge generation layer 23 by using an azo pigment having a sensitivity to analog light.

At the time of writing, analog light is used as writing light sequentially, e.g., in the order of R light, G light and B light.

The other structure and operation are similar to those in the previous embodiment. By using such a color filter CF, a color image can be obtained.

In the above-described embodiment, three-colored filter segments are included in a single SLM but, alternatively, it is possible to use three SLMs having an R color filter, a G color filter and a B color filter, respectively, to effect a color display.

Figure 11:
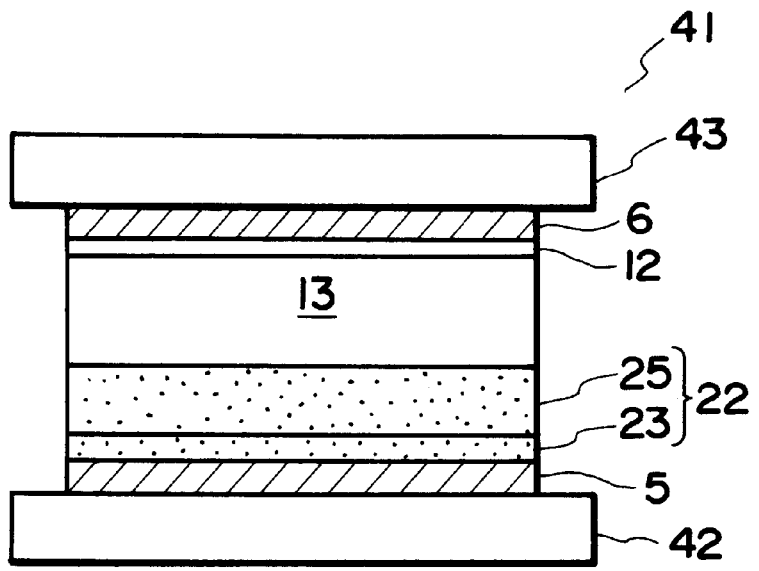

FIG. 11 is a sectional view showing still another embodiment of SLM according to the present invention.

Referring to FIG. 11, an SLM 41 according to this embodiment includes PET films 42 and 43, in thicknesses of, e.g., ca. 100 $\mu$m, as transparent substrates.

The liquid crystal 13 comprises a polymeric, ferroelectric liquid crystal in the form of a film. Such a liquid crystal may be formed as a mixture of a low-molecular weight (or non-polymeric) ferroelectric liquid crystal and a thermoplastic amorphous polymer. The low-molecular weight liquid crystal may be one having a bookshelf layer structure. The thermoplastic amorphous polymer may comprise polystyrene, polycarbonate, etc., having no optical anisotropy.

The PET films 42 and 43 may be provided with transparent electrodes 5 and 6, respectively, by vapor deposition of ITO, followed optionally by patterning. Such ITO films can also be formed by application of an ITO precursor according to the sol-gel process.

One PET film 43 is coated with a polyimide precursor, followed by baking at 150° C., to form a 10 $\mu$m-thick polyimide alignment film 12, which is then rubbed with a nylon cloth.

The other PET film 42 is provided with a photoconductor layer 22 as a photoelectric conversion layer which, similarly as in the previous embodiments, may be of a laminate type including a charge generation layer 23 and a charge transport layer 25 which may preferably have a surface energy of at most 30 dyn/cm$^2$. As the polymeric liquid crystal 13 has a shape-retaining property, the charge transport layer 25 need not have a rigid surface but a surface hardness of 4B (pencil hardness) or harder would be sufficient.

Then, ca. 2 $\mu$m-dia. spacer beads are dispersed on the photoconductor layer 22, and a polymeric ferroelectric liquid crystal 13 is applied onto the PET film 43 provided with the transparent electrode 6 and the alignment film 12. Then, the PET films thus treated are applied to each other at an elevated temperature of 100° C., and an excessive amount of the liquid crystal 13 gushed out is wiped out, followed by gradual cooling to room temperature and peripheral sealing with an epoxy adhesive.

The spacer beads may be non-adhesive or adhesive, and can be omitted in a smaller size SLM wherein a polymeric, ferroelectric liquid crystal is applied in a uniform thickness.

The photoconductor layer 22 can be formed in a single layer of a mixture type.

Hereinbelow, the present invention will be described based on specific examples.

EXAMPLE 1

A ferroelectric liquid crystal composition was prepared according to a prescription shown below. The composition showed a spontaneous polarization (at 25° C.) of 26 nC/cm², a smectic layer inclination angle δ (at 20° C.)=0 deg., and an apparent pretilt angle of 27 deg.

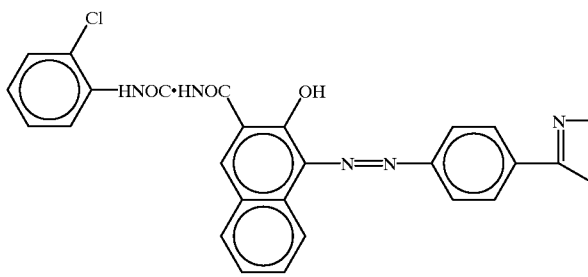

A:
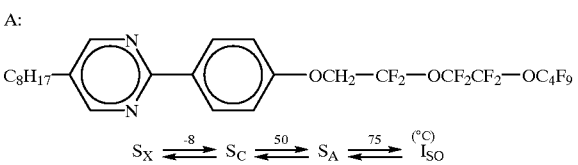

B₁:
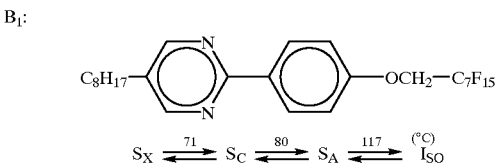

B₂:
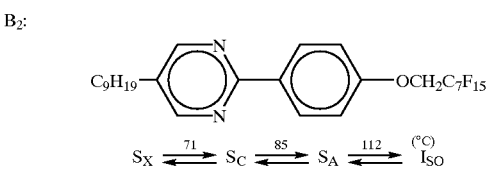

B₃:
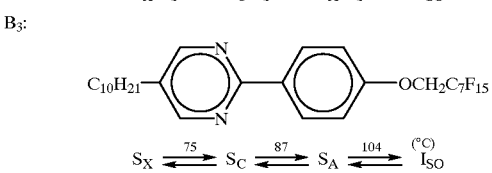

C: (Chiral dopant)
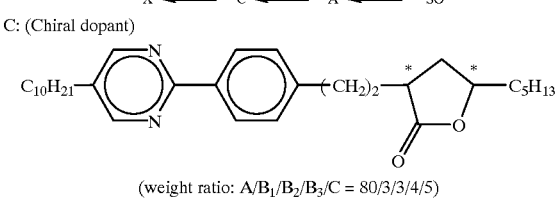

(weight ratio: A/B₁/B₂/B₃/C = 80/3/3/4/5)

By using the above liquid crystal composition, a liquid crystal device was prepared as follows.

Two glass substrates were respectively surface-coated with a 700 nm-thick ITO film, of which the peripheral portion corresponding to the real portion was removed by patterning to form a transparent electrode.

For preparing a charge generation layer, a dispersion liquid was prepared by mixing 4 wt. parts of a compound of the following structural formula, 2 wt. parts of benzal resin (MW (weight-average molecular weight)=24000), and 34 wt. parts of cyclohexanone and dispersing the mixture together with 1 mm-dia. glass beads in a sand mill apparatus on a warm bath for 20 hours, followed by dilution with 60 wt. parts of butanol.

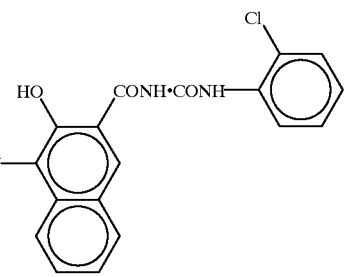

The above-prepared dispersion liquid was applied onto the ITO film of one of the substrates by spin coating, followed by drying at 80° C. for 15 min., to form a 0.2 μm-thick charge generation layer.

Then, 10 wt. parts of a hydrazone compound of the structural formula shown below and 10 wt. parts of bisphenol Z-type polycarbonate (Mw=39000) were dissolved in a mixture solvent of 40 wt. parts of dichloromethane and 20 wt. parts of monochlorobenzene to form a solution, which was then applied by spin coating onto the above-prepared charge generation layer, and dried at 120° C. for 60 min. to forma 0.85 μm-thick charge transport layer.

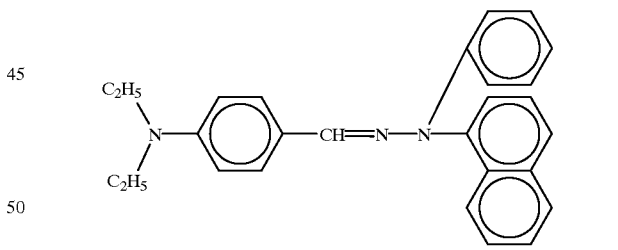

On the other hand, the other substrate provided with an ITO film was coated by printing with a polyimide precursor solution, followed by baking at 220° C. in an oven for 1 hour to form a 200 Å-thick polyimide alignment film, which was then rubbed with a nylon cloth at a sufficient load to be provided with a uniaxial alignment control force.

Then, 2 μm-dia. spacer beads dispersion in IPA were applied by a spinner onto the substrate provided with the alignment film, followed by drying at 110° C. for 5 min. in an oven.

Then, an epoxy sealing agent was applied at a periphery of the substrate provided with the alignment film and, after drying for leveling, the other substrate was applied thereonto. Then, the stacked structure was heated in an oven at 140° C. for 1.5 hour to cure the sealing agent to for a cell. Then, the liquid crystal was injected at 95° C. and cooled at a rate of 1° C./min.

After the liquid crystal injection, the resultant liquid crystal device was heated again to 110° C. and gradually cooled to 90° C. at a rate of 0.1 ° C./min, followed by standing for cooling to room temperature.

The thus-prepared liquid crystal (SLM) was evaluated in a manner described below with reference to FIGS. 12A–12D.

Figure 12A:
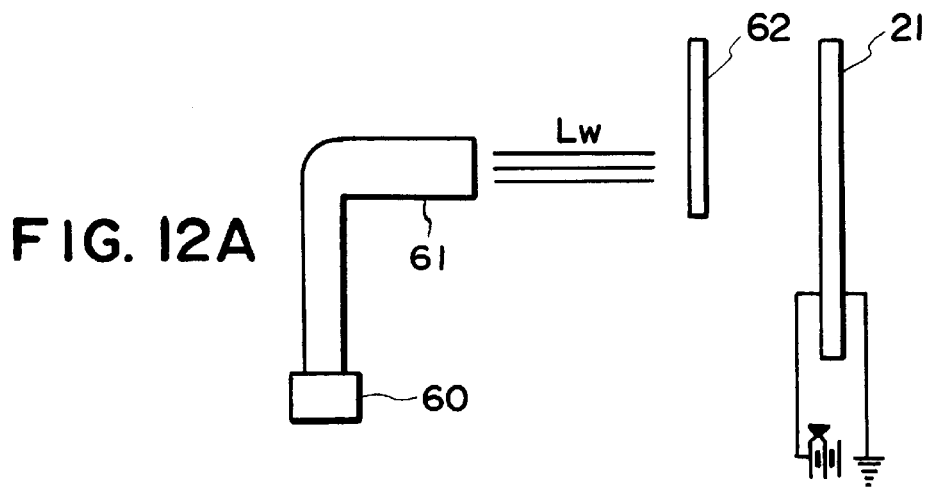
FIGS. 12A–12D are schematic views for illustrating data writing and data readout operations using a liquid crystal device according to the invention.
Figure 12B:
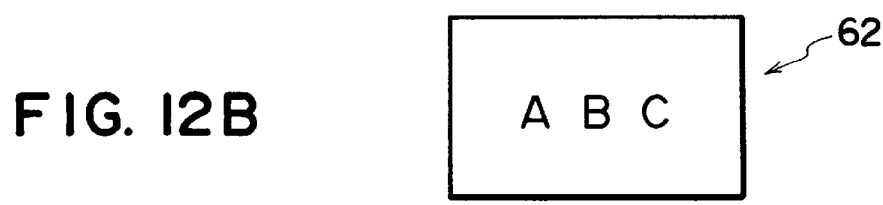

As shown in FIG. 12A, a writing light illumination apparatus including a semiconductor laser 60 and optical fiber 61 was used to emit laser light comprising infrared rays having a wavelength of 780 nm at an energy density of 0.03 $\mu J/cm^2$, with which the above-prepared SLM 21 was illuminated for 500 psec via a mask 62 having an image pattern as shown in FIG. 12B, while applying a voltage of 30 volts between the electrodes.

Figure 12C:
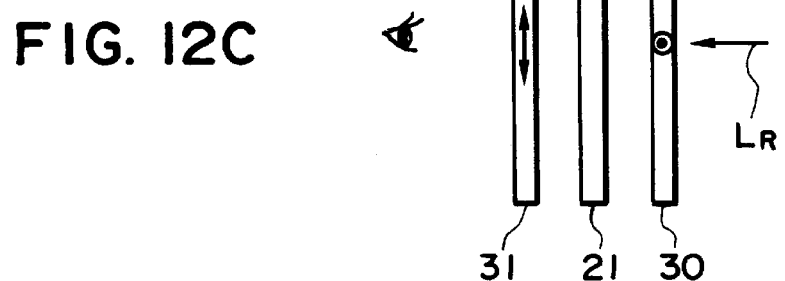
Figure 12D:
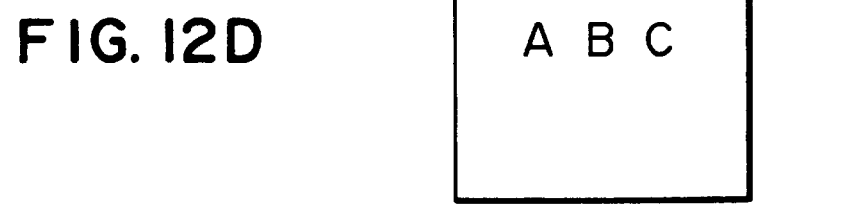

The thus-illuminated SLM 21 was placed between a pair of polarizers 30 and 31 arranged in cross nicols and illuminated with white writing light $L_R$, whereby an image as shown in FIG. 12D was displayed on the SLM 21.

It was observed that the contrast of the displayed image changed when the writing energy density was changed. By changing the direction of the cross nicol polarizers 30 and 31, the displayed image caused a positive-negative inversion.

EXAMPLE 2

In order to provide an SLM giving an improved display image contrast, the photoelectric conversion layer used in the present invention may preferably be designed to exhibit performances as described below.

When a polyelectric conversion layer or photoconductor layer is locally photo-illuminated, a potential difference is developed between the illuminated portion and the non-illuminated portion. This is called a photo-memory characteristic. When an SLM having such a photoelectric conversion layer having developed a potential difference (photo-memory characteristic) is supplied with an external voltage, a display image contrast is determined depending on the potential difference.

Accordingly, we have determined a condition of photo-memory characteristic for providing a good contrast based on a product of illumination light intensity and illumination time and a potential difference based on the following measurement method.

First of all, a sample SP comprising a photoconductor layer 122 formed on a transparent electrode 105 was covered with a photomask 127 having a central stripe-shaped aperture 127a and illuminated via the mask 127 with illumination light having an intensity of A [lux] for a time T [sec]. Then, after a product of the illumination light intensity A and the illumination time T reached $1 \times 10^4$ [lux.sec], the sample SP was set in a commercially available electrostatic copying paper tester ("Electrostatic Paper Analyzer/EPA-8100", available from Kawaguchi Denki K.K.) to be changed by corona discharge.

As the illuminated portion of the photoconductor layer 122 exposed through the aperture 127a of the mask 127 had a photo-memory characteristic, the surface potential of the illuminated portion (I.P.) was lowered by $V_M$ [volts] than the non-illuminated portion (N.I.P.), thus giving a contrast correspond to $V_M$ [volts].

Now, based on a ratio between the potential drop $V_M$ to the dark-part potential $V_D$, the following conditional formula was determined for providing a good contrast: i.e., $0.1 \leq |V_M/V_D| \leq 1.0$ for $A \times T \geq 1 \times 10^4$ [lux.sec], wherein A [lux]: illumination light intensity, T [sec]: illumination time, $V_D$ [V]: a potential at a non-illuminated portion of the photoelectric conversion layer, and $V_M$ [V]: a potential difference between a non-illuminated portion and an illuminated portion of the photoelectric conversion layer.

Accordingly, in order to provide a high-contrast SLM, the materials and the thicknesses of the respective layers should be determined so as to satisfy the above condition.

A specific example thereof will now be described.

A substantial number of glass substrates were provided with a 700 Å-thick ITO film through the sol-gel process including application and curing, followed by patterning to form transparent electrodes thereof.

A dispersion liquid for providing a charge generation layer was prepared by subjecting 4.2 wt. parts of a compound of the formula shown below, 2 wt. parts of polymethyl methacrylate (Mw=11000), and 35 wt. parts of cyclohexanone to dispersion together with 1 mm-dia. glass beads in a sand mill apparatus for 12 hours, followed by dilution with 60 wt. parts of MEK.

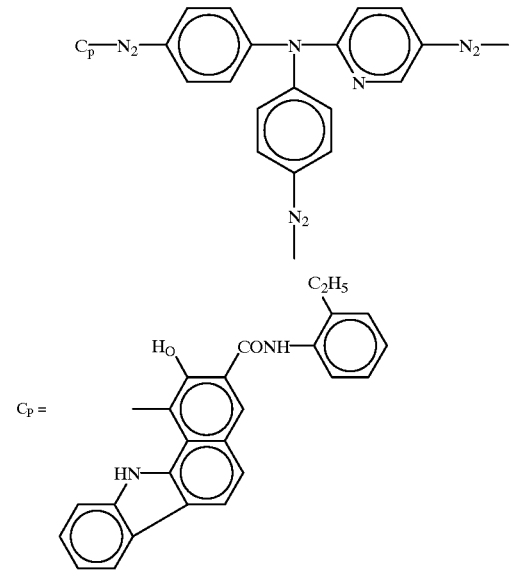

Then, four of the above-prepared number of substrates provided with a transparent electrode were coated with the above-prepared dispersion liquid by spin coating, followed by drying at 90° C. for 15 min. to form a 0.1 $\mu$m-thick charge generation layer.

Separately, four types of coating solutions were prepared respectively by dissolving one of compounds (1)–(4) shown below together with their structural formulae each in an amount of 10 wt. parts and 10 wt. parts of bisphenol Z-type polycarbonate (Mw=35000) in a mixture solvent of 40 wt. parts of dichloromethane and 20 wt. parts of monochlorobenzene. The thus-formed four solutions were applied onto the above-formed charge generation layer of the four substrates, respectively, by spin coating, followed by drying at 120° C. for 60 min. to form a 0.9 $\mu$m-thick charge transport layer, thereby completing a laminate photoconductor layer.

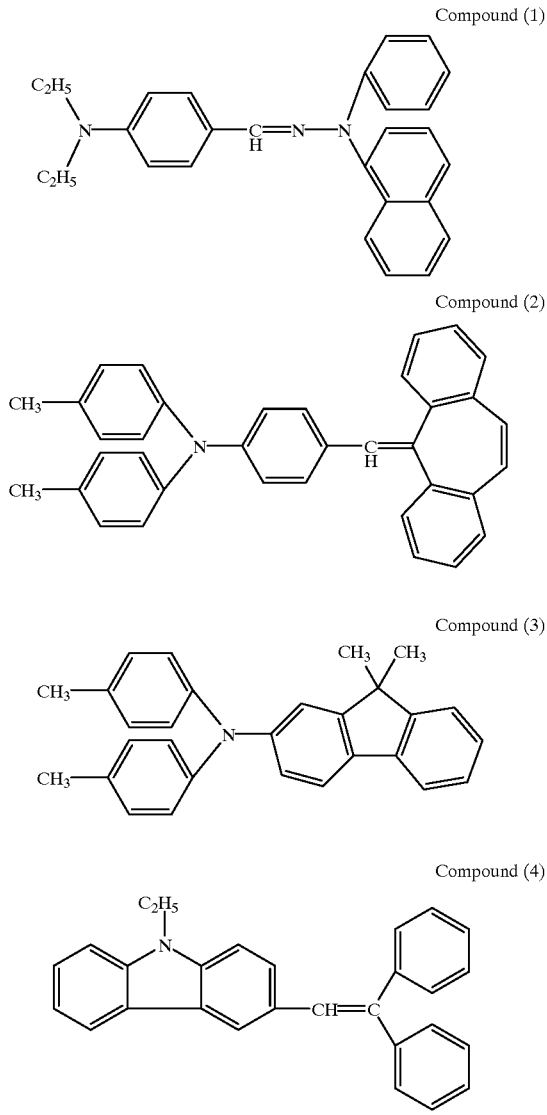

Compound (1)
Compound (2)
Compound (3)
Compound (4)

The thus-prepared four substrate samples provided with photoconductor layers including charge transport layers containing four types of different charge transporting compounds (1)–(4), respectively, were subjected to measurement of a ratio $V_M/V_D$ in the manner described above with reference to FIGS. 13A–13C under a condition of providing a product AT of $5\times10^4$ [lux.sec], whereby the results shown in the following Table 3 were obtained.

TABLE 3

| Substrate sample | Charge transporting substance | $V_M/V_D$ |
|---|---|---|
| 1 | Compound (1) | 0.70 |
| 2 | Compound (2) | 0.36 |
| 3 | Compound (3) | 0.15 |
| 4 | Compound (4) | 0.09 |

The above Table 3 shows that Substrate samples 1–3 using Compounds (1)–(3) as charge-transporting substances satisfied the above-described $V_M/V_D$ condition but Substrate sample 4 using Compound (4) failed to satisfy the condition.

Then, other four substrates provided with only ITO films were respectively provided with a 200 Å-thick polyimide alignment film through printing, baking at 220° C. for 1 hour in an oven and surface rubbing with a nylon cloth. Then, 2 μm-dia. spacer beads dispersed in IPA were dispersed by spinner coating onto the alignment films of the four substrates, and dried at 110° C. for 5 min. in an oven.

Then, an epoxy sealing material was applied at peripheral parts of the substrates provided with the alignment films and subjected to drying for leveling, and onto the four substrates provided with the alignment films, the above-prepared four substrates provided with four types of photoconductor layers were applied, followed by curing at 140° C. for 1.5 hour in an oven.

Then, the thus-prepared four types of cells were subjected to injection of the same ferroelectric liquid crystal as cased on Example 1 at 95° C., followed by cooling at 1° C./min. After the liquid crystal injection, the cells were heated to 110° C., gradually cooled at a rate of 0.1° C./min. to 90° C., and then left standing for cooling to room temperature, to prepare four types of SLMs including SLM Samples S1–S3 using Compounds (1)–(3), respectively, as charge-transporting substances and Comparative SLM Sample CS1 using Compound (4) as a charge-transporting substance.

Then, the above-prepared Samples S1–S3 and Comparative Sample CS1 were exposed, in a system as shown in FIG. 12A, to laser light (infrared rays having a wavelength of 780 nm) emitted from a semiconductor laser 60 and optical fiber 61 and transmitted through a mask 62 having an image pattern as shown in FIG. 12B. The laser light exposure density was 0.5 μJ/cm². After the exposure, a DC voltage of 40 [volts] was applied between the transparent electrodes of each SLM sample to effect data writing.

Then, each sample SLM was disposed between a pair of polarizers 30 and 31 arranged in cross nicols and illuminated with readout light $L_R$. As a result, SLM Samples S1–S3 provided display images as shown in FIG. 12D at a good contrast, while the displayed images caused a negative-positive inversion by changing the direction of the polarizers 30 and 31. On the other hand, Comparative SLM Sample CS1 provided a display image only at a low contrast.

EXAMPLE 3

Eight glass substrates each provided with a transparent electrode formed by sputtering and patterning of ITO film.

A dispersion liquid for providing a charge generation layer was prepared by subjecting 4 wt. parts of a compound of the structural formula shown below, 2 wt. parts of benzal resin (Mw=24000) and 34 wt. parts of cyclohexanone to dispersion together with 1 mm-dia. glass beads for 20 hours in a sandmill apparatus, followed dilution with 60 wt. parts of butanol.

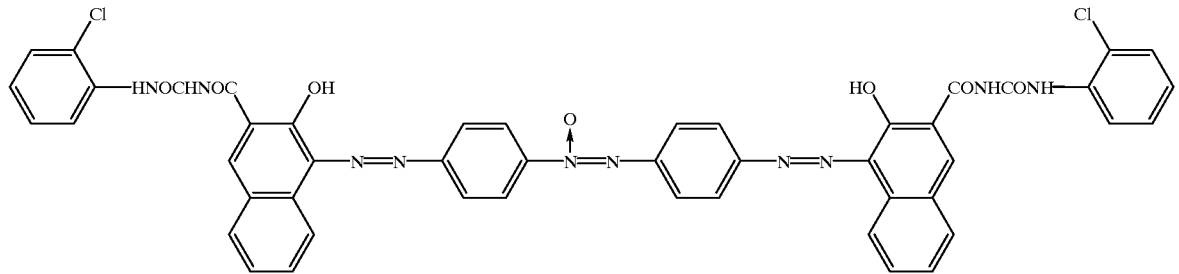

Then, four substrates each provided with a transparent electrode were coated with the above-prepared dispersion liquid by spin coating, followed by drying at 80° C. for 15 min. to form a charge generation layer.

Separately, four types of coating solutions were prepared respectively by one of the same Compounds (1)–(4) as used in Example 2 above each in an amount of 10 wt. parts and 10 wt. parts of bisphenol Z-type polycarbonate (Mw=39000) in a mixture solvent of 40 wt. parts of dichloromethane and 20 wt. parts of monochlorobenzene. The thus-formed four solutions were applied onto the above-formed charge generation layer of the four substrates, respectively, by spin coating, followed by drying at 120° C. for 60 min. to form 0.8 μm-thick charge transport layers, thereby providing four substrates with different photoconductor layers.

Figure 13A:
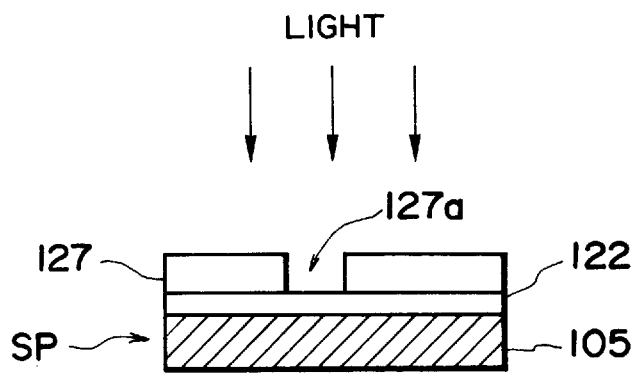
FIGS. 13A–13C are a sectional view, a plan view and a graph for illustrating method of measuring a photo-memory characteristic.
Figure 13B:
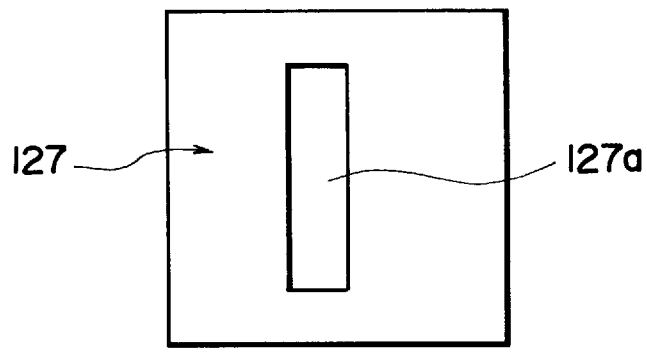
Figure 13C:
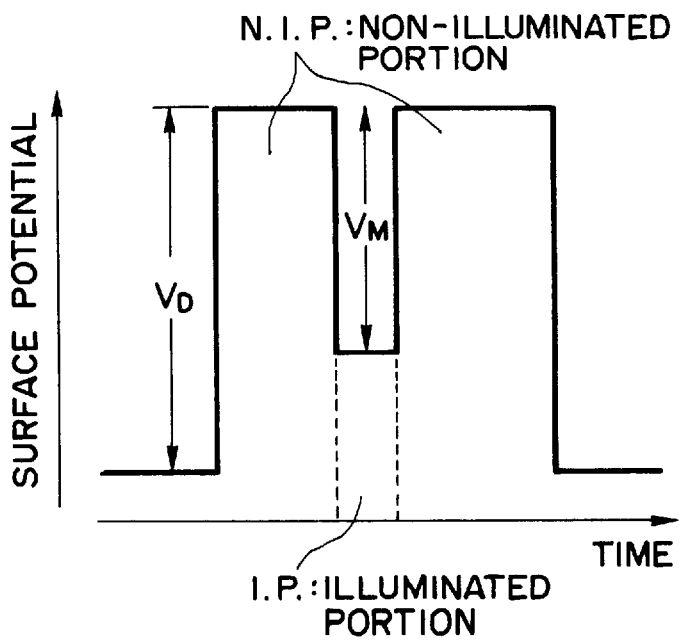

The thus-prepared four substrate samples were prepared and evaluated with respect to $V_M/V_D$ ratios at an A.T. product of $2.5 \times 10^5$ [lux.sec] in a manner escribed with reference to FIGS. 13A–13C, whereby esults shown in the following Table 4 were obtained.

TABLE 4

| Substrate sample | Charge transporting substance | $V_M/V_D$ |
|---|---|---|
| 5 | Compound (1) | 0.80 |
| 6 | Compound (2) | 0.55 |
| 7 | Compound (3) | 0.20 |
| 8 | Compound (4) | 0.07 |

The above Table 4 shows that Substrate samples 5–7 using Compounds (1)–(3) as charge-transporting substances satisfied the above-described $V_M/V_D$ condition but Substrate sample 8 using Compound (4) failed to satisfy the condition.

Then, other four substrates provided with only ITO films were respectively provided with a polyimide alignment film similarly as in Example 2, and by using the four substrates provided with an alignment film and the above-prepared four substrates provided with different photoconductor layers, four types of SLMs were prepared otherwise in the same manner as in Example 2, including SLM samples S4–S6 using Compounds (1)–(3) as charge-transporting substances and Comparative SLM Sample CS2 using Compound (4) as a charge-transporting substance.

Then, each sample SLM was subjected to photo-writing in a system similar to the one shown except for using a strobo-flash instead of the laser 60 and a negative film instead of the mask 62. Thereafter, a DC voltage of 50 [volts] was applied between of each SLM sample to effect data writing.

Then, each sample SLM was disposed between a pair of polarizers 30 and 31 arranged in cross nicols and illuminated with readout light $L_R$. As a result, SLM Samples S4–S6 provided display images with clear reproduction of contrast due to film density differences, while the displayed images caused a negative-positive inversion by changing the direction of the polarizers 30 and 31. On the other hand, Comparative SLM Sample CS2 provided a display image only at a low contrast.

EXAMPLE 4

Sample SMLs were prepared in the following manner by using the same liquid crystal composition as used in Example 1.

Twenty substrates each provided with an ITO electrode were prepared in the same manner as in Example 1. Among them, 10 substrates were provided with a uniaxial alignment film in the same manner as in Example 1.

Among the remaining 10 substrates, 5 substrates were each provided with a charge generation layer in the same manner as in Example 1, and were further provided with 5 types of charge transport layers comprising biphenylene as a charge transporting substance dispersed in 5 species of resins, respectively, shown in the following Table 5, to complete the photoconductor layers, of which the surface energies were measured as also shown in Table 5, Then the 5 substrates provided with the photoconductor layers were applied to 5 substrates provided with alignment films prepared above to form blank cells, which were filled with the liquid crystal to prepare 5 SLM samples (samples Nos. 11–15).

TABLE 5

| Sample No. | Charge transporting substance | Resin | Surface energy [dyn/cm²] | Alignment performance |
|---|---|---|---|---|
| 11 | biphenylene | PTFE | 19.4 | A |
| 12 | biphenylene | polyvinylindene fluoride | 27.6 | A |
| 13 | biphenylene | polycarbonate | 29.0 | A |
| 14 | biphenylene | PMMA | 42.4 | C |
| 15 | biphenylene | nylon 66 | 42.0 | C |

On the other hand, 5 substrates provided with an ITO were each provided with 5 types of single photoconductor layers comprising a mixture of titanyl phthalocyanine (charge-generating substance) and anthracene (charge-transporting substance) dispersed in one of 5 species of resins, respectively, shown in Table 6 below. The surface energies of the photoconductor layers were measured as also shown in Table 6. Then, the 5 substrates provided with the photoconductor layers were applied to 5 substrates provided with alignment films to form blank cells, which were filled with the liquid crystal to prepare 5 SLM samples (Samples Nos. 16–20).

TABLE 6

| Sample No. | Photo-conductor | Resin | Surface energy [dyn/cm$^2$] | Alignment performance |
|---|---|---|---|---|
| 16 | TiOPC*/anthracene | PTrFE* | 19.4 | A |
| 17 | " | PAAM* | 27.6 | A |
| 18 | " | poly-carbonate | 29.0 | A |
| 19 | " | poly-ethylene | 35.0 | B |
| 20 | " | polyamide | 38.0 | B |

*TIOPC: titanylphthalocyanine
PTrFE: polytrifluoroethylene
PAAM: polyacrylamide

The above-prepared 10 types of SLM samples (Samples Nos. 11–20) were evaluated with respect alignment performances by observation through a polarization microscope. As a result, Samples Nos. 11, 12, 13, 16, 17 and 18 each showed good alignment performance (A). Samples Nos. 19 and 20 exhibited slight defects within an extent of practically no problem (B). Samples Nos. 14 and 15 showed random alignment defects, which could be reduced only through an additional process, such as realignment including re-heating and gradual cooling, thus being evaluated as practical application being difficult (C). The alignment performance evaluation results are also indicated in Tables 4 and 5 with ranks A, B and C as noted above.

The surface energies listed in Tables 4 and 5 were values obtained by measurement of a liquid droplet contact angle based on a macroscopic surface state of a substrate according to the following method.

As reagents for providing liquid droplets, α-bromonaphthalene (A), methylene iodide (B) and water (C), etc. may be used. After measurement of contact angles with droplets of these reagents, the surface energy of each substrate may be calculated according to formulae reported by Kitazaki, et al., "Extension of Fowkes Formula and Evaluation of Surface Tension of Polymer Solid" (in Japanese), Journal of Nippon Settsuyaku Kyokai, Vol, 8, No. 3 (1972) page 131.

The results shown in Table 4 indicate that, in the case of a laminate-type photoconductor layer, it is preferred to use PTFE (polytetrafluoroethylene), polyvinylidene fluoride, and polycarbonate providing a surface energy of at most 30 dyn/cm$^2$ as a matrix resin for the surface layer.

Further, Table 5 shows that, in the case of a single-layered photoconductor layer, it is preferred to use polytrifluoroethylene, polyacrylamide, and polycarbonate as a matrix resin for the surface layer.

EXAMPLE 5

An SLM was prepared in the following manner.

Two glass substrates were respectively provided with a transparent electrode by forming a 700 Å-thick ITO film according to the sol-gel process including coating and curing, and patterning the ITO film.

Then, one substrate was coated by spin coating with a dispersion liquid formed by dispersing 4 wt. parts of mixture crystal-phthalocyanine of titanyl phthalocyanine and vanadyl phthalocyanine, 8 wt. parts of polyester resin (trade name: "Almatix P-645", available from Mitsui Toatsu Kagaku K.K.), 2 wt. parts of melamine resin (trade name: "Uban 1R", available from Mitsui Toatsu Kagaku K.K.) and 100 wt. parts of cyclohexanone together with 1 mm-dia. glass beads for 70 hours in a sand mill. Then, the coating layer was dried at 90° C. for 15 min. to form a 0.55 μm-thick single-layered photoconductor layer containing only a charge-generating substance.

The photoconductor layer was subjected to measurement of a photo-attenuation characteristic, thereby providing a characteristic curve (solid line) and a curve of difference coefficient |ΔV/ΔE| (dotted line) as shown in FIG. 15, indicating a maximum of 3.7 of the differential coefficient.

Incidentally, Figure shows a normalized photoattenuation curve obtained in the following manner. A sample photoconductor layer is charged in dark by corona discharging to an initial potential (normalized as 1) and then subjected to photo-illumination for a period until giving a normalized light quantity E resulting in a potential of substantially zero by measurement with a surface potential meter.

On the other hand, the other substrate was provided with a 200 Å-thick polyimide alignment film through printing of a precursor solution, baking at 220° C. for 1 hour in an oven and rubbing with a nylon cloth. Then, 2 μm-dia. spacer beads dispersed in IPA were dispersed onto the alignment film by a spinner and dried at 110° C. for 5 min. in an oven. Then, an epoxy sealing adhesive was applied (printed) at the periphery of the substrate with the alignment film and dried for leveling, an the substrate provided with the photoconductor layer not subjected to rubbing was applied thereonto, followed by heating at 140° C. for 1.5 hour in an oven. Then, the same liquid crystal as used in Example 1 was injected into the resultant cell at 95° C. and cooled at a rate of 1° C./min.

After the liquid crystal injection, the cell was heated to 110° C., gradually cooled to 90° C. at a rate of 0.1° C./min. and then left standing for cooling to room temperature, thereby obtaining an SLM.

Then, in a system similarly as shown in FIG. 12A including a semiconductor laser 60 except for using a laser scanning unit instead of the optical fiber 61 and the mask, the above-prepared SLM was exposed to scanning laser light (infrared rays having a wavelength of 780 nm) emitted from the laser 60 and carrying a character image and supplied with a DC voltage of 40 volts for writing the character image.

Then, the exposed SLM was placed between a pair of cross nicol polarizers as shown in FIG. 12C and illuminated with readout light L$_R$. As a result, the SLM provided a clear displayed image at a good dot reproducibility, while the displayed image caused a positive-negative inversion by changing the position of the cross nicol polarizers.

EXAMPLE 6

An SLM was prepared in the following manner.

Two glass substrates were respectively provided with a transparent electrode by sputtering and patterning.

Then, one substrate was coated by spin coating with a dispersion liquid formed by dispersing 0.3 wt. part of tetra-nitrated copper phthalocyanine, 40 wt. parts of polyester resin (trade name: "Almatix P-645", available from Mitsui Toatsu Kagaku K.K.), 10 wt. parts of melamine resin (trade name: "Uban 20-HS", available from Mitsui Toatsu Kagaku K.K.) and 200 wt. parts of cyclohexanone together with 1 mm-dia. glass beads for 20 hours in a sand mill. Then, the coating layer was dried at 80° C. for 15 min. to form a 0.65 μm-thick single-layered photoconductor layer containing only a charge-generating substance.

The photoconductor layer was subjected to measurement of a photo-attenuation characteristic, thereby providing a characteristic curve and a curve of difference coefficient $|\Delta V/\Delta E|$, indicating a maximum of 5.1 of the differential coefficient.

An SLM was prepared by using the substrate provided with the photoconductor layer otherwise in the same manner as in Example 5 and exposed to scanning laser light having a wavelength of 810 nm under application of a DC voltage of 45 volts for writing a character image in a system similar to the one used in Example 5.

Then, the exposed SLM was placed between a pair of cross nicol polarizers as shown in FIG. 12C and illuminated with readout light $L_R$. As a result the SLM provided a clear displayed image at a good dot reproducibility, while the displayed image caused a positive-negative inversion by changing the position of the cross nicol polarizers.

COMPARATIVE EXAMPLE

A comparative SLM for comparison with Examples 5 and 6 was prepared in the following manner.

Two glass substrates were respectively provided with a transparent electrode by sputtering formation and patterning of ITO. Then, one substrate was coated by spin coating with a dispersion liquid formed by dispersing 5 wt. parts a charge-generating substance and 5 wt. parts of a charge-transporting substance having structural formulae respectively shown below, 5 wt. parts of polycarbonate resin (trade name "z-200" available from Mitsubishi Gas Kagaku K.K.) and a mixture solvent of 40 wt. parts of monochlorobenzene and 80 wt. parts of dichloroethane together with 1 mm-dia. glass beads for 40 hours in a sand mill apparatus.

(Charge-generating substance)

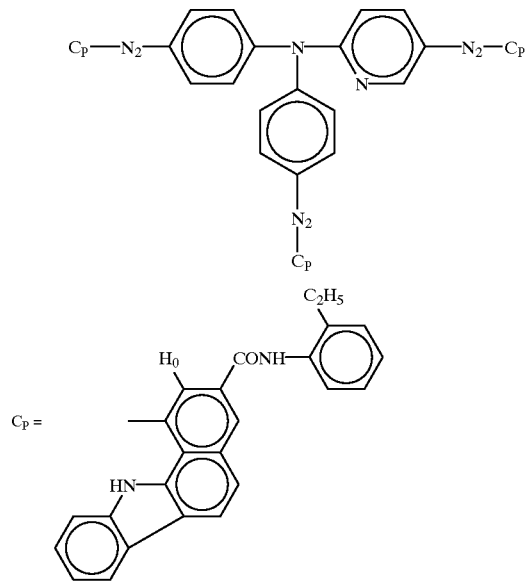

(Charge-transporting substance)

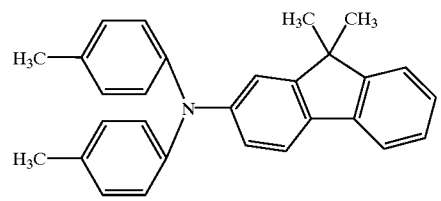

The resultant photoconductor layer provided a photo-attenuation characteristic curve exhibiting not a maximum of difference coefficient $|\Delta V/\Delta E|$ with respect to light quantity E but a nearly constant value of ca. 1.

An SLM was prepared by using the substrate provided with the photoconductor layer otherwise in the same manner as in Example 5 and exposed to scanning laser light having a wavelength of 810 nm under application of a DC voltage of 70 volts for writing a character image in a system similar to the one used in Example 5.

Then, the exposed SLM was placed between a pair of cross nicol polarizers as shown in FIG. 12C and illuminated with readout light $L_R$. As a result, the SLM caused a positive-negative inversion of the displayed image by changing the position of the cross nicol polarizers, but the displayed image was accompanied with unclear portions around dots.

As described above, by forming a photoconductor layer providing a photo-attenuation curve giving a differential coefficient ($\Delta$ potential/$\Delta$ light quantity–light quantity characteristic exhibiting a maximum, a photo-current flows through a photoconductor layer at a good contrast, thereby allowing data writing at a high resolution corresponding to an orientation change of the liquid crystal caused by the photo-current. Accordingly, it becomes possible to use a simple optical system without necessitating a complex optical system including a screen and a dielectric mirror as in a reflecting-type display apparatus. Particularly, by combining it with a writing light emission apparatus allowing a digital image processing scheme, it becomes possible to effect high-resolution data writing at an excellent dot reproducibility.

EXAMPLE 7

Twenty two glass substrates were provided with a 700 Å-thick ITO film through the sol-gel process including application and curing, followed by patterning to form transparent electrodes thereof.

A dispersion liquid for providing a charge generation layer was prepared by subjecting 2 wt. parts of a compound of the formula shown below, 2 wt. parts of polycarbonate resin (trade name: "Z-200", available from Mitsubishi Kagaku K.K.) and 20 wt. parts of tetrahydrofuran to dispersion together with 1 mm-dia. glass beads in a sand mill apparatus for 60 hours.

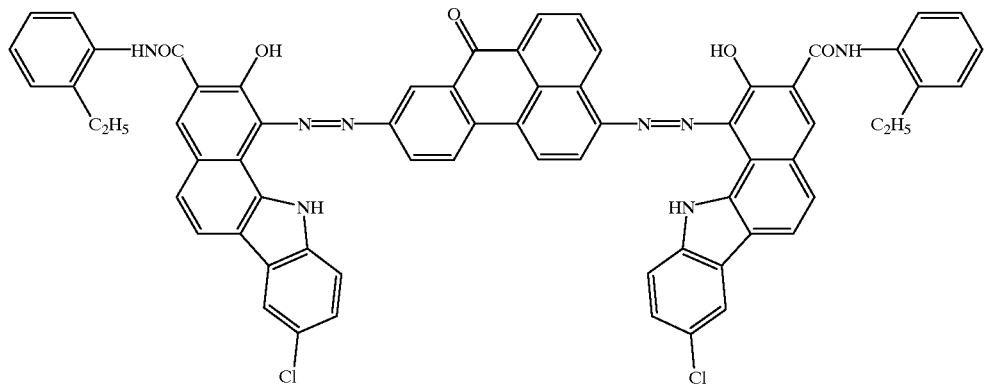

Then, four of the above-prepared number of substrates provided with a transparent electrode were coated with the above-prepared dispersion liquid by spin coating, followed by drying at 90° C. for 15 min. to form a 0.65 μm-thick charge generation layer.

Separately, a coating solution was prepared by dissolving 5 wt. parts of a triarylamine compound of the formula shown below:

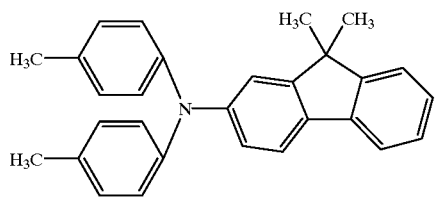

and 5 wt. pats of polycarbonate resin (trade name "Z-200", available from Mitsubishi Gas Kagaku K.K.), 70 wt. parts of chloromethane. The thus-formed four solution was applied onto the above-formed charge generation layer each by spin coating, followed by drying at 120° C. for 60 min. to form a 0.025 μm-thick charge transport layer, thereby completing a laminate photoconductor layer. The thus prepared substrate is called a substrate Sample S21.

Ten types of substrate samples (Samples S22–28 and Comparative Samples CS21–23) were prepared in the same manner as above except for changing the thicknesses of the charge generation layer (CGL) and the charge transport layer (CTL) and the weight ratio (P/B) between the charge generating substance (P) and the binder resin (B) in the charge generation layer, respectively, as shown in the following Table 7.

TABLE 7

| Substrate sample | P/B | CGL thickness (μm) | CTL thickness (μm) | $C_{CTL}/C_{CGL}$ |
|---|---|---|---|---|
| S21 | 1/1 | 0.65 | 0.025 | 16.25 |
| S22 | 1/2 | 0.65 | 0.025 | 18.57 |
| S23 | 1/3 | 0.67 | 0.025 | 21.32 |
| S24 | 1/5 | 0.5 | 0.025 | 17.14 |
| S25 | 1/3 | 0.28 | 0.07 | 2.55 |
| S26 | 1/2 | 1.0 | 0.05 | 14.29 |
| S27 | 1/10 | 0.25 | 0.17 | 1.26 |
| S28 | 1/2 | 0.65 | 0.025 | 19.35 |
| CS21 | 1/2 | 0.1 | 0.025 | 0.71 |
| CS22 | 1/2 | 0.75 | 0.25 | 0.89 |
| CS23 | 1/3 | 0.4 | 0.18 | 0.92 |

In Table 7 above, ratios $C_{CTL}/C_{CGL}$ between the capacitances of the charge transport layer and the charge generation layer, and the values of $C_{CTL}$ and $C_{CGL}$ are based on values measured with respect to dielectric measurement samples having a laminar structure of Al substrate/CGL (or CTL) of 3–6 μm in thickness/Au film (vapor deposited) by using an LF impedance analyzer (Model "4192A", available from Yokogawa Hewlett-Packard K.K.).

As shown in Table 7, the substrate samples S21–S28 provided a ratio $C_{CTL}/C_{CGL}$ exceeding 1.0 and the comparative substrate samples CS21–CS23 provided a $C_{CTL}/C_{CGL}$ below 1.0.

Figure 16:
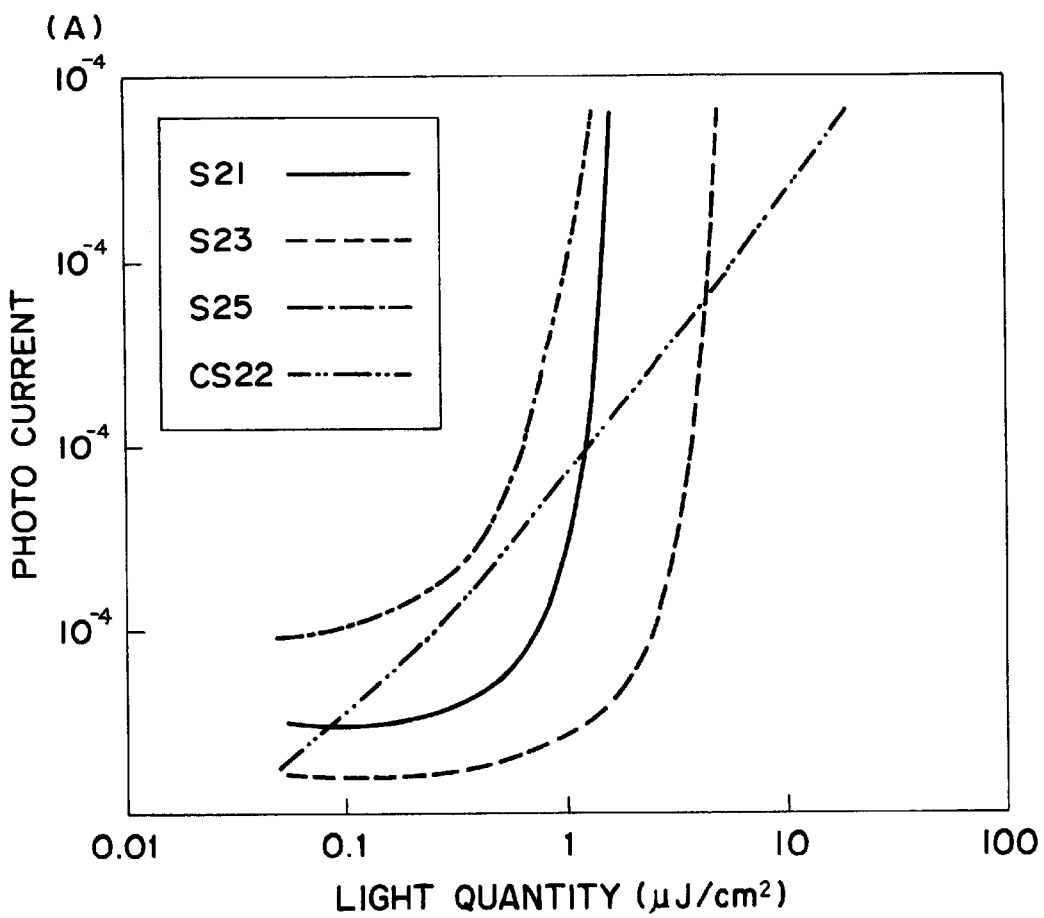
FIG. 16 is a graph showing characteristics of photoelectric conversion layers used in the invention.

The substrate samples S21–S28 and CS21–CS23 were subjected to measurement of the photo-electric conversion characteristics (photo-current vs. light quantity characteristics) of the respective photoconductor layers. FIG. 16 shows the results of the measurement for the substrates S21, S23, S25 and CS22 among them. As summarily shown for some sample substrates in FIG. 16, the substrates having a $C_{CTL}/C_{CGL}$ ratio of at least 1.0 exhibited an avalanche effect. In contrast thereto, the comparative substrates having a $C_{CTL}/C_{CGL}$ ratio of below 1.0 showed a large dark current and failed to cause an avalanche effect.

From the above results, it has been clarified that the induction point and γ (slope) of photocurrent can be controlled by changing the thicknesses of the charge generation layer and the charge control layer and the ratio of the charge-generating substance and the binder (P/B) in the charge generation layer.

The remaining 11 substrates each provided with an ITO electrode were respectively provided with a 200 Å-thick polyimide alignment film through printing, baking at 220° C. for 1 hour in an oven and surface-rubbing with a nylon cloth. Then, 2 μm-dia. spacer beads dispersed in IPA were dispersed by spinner coating onto the alignment films of the substrates, and dried at 110° C. for 5 min. in an oven.

Then, an epoxy sealing material was applied at peripheral parts of the substrates provided with the alignment films and subjected to drying for leveling, and onto the substrates provided with the alignment films, the above-prepared four substrate samples S21–S28 and CS21–CS23 provided with different photoconductor layers were applied, followed by curing at 140° C. for 1.5 hour in an oven.

Then, the thus-prepared 11 types of cells were subjected to injection of the same ferroelectric liquid crystal as used in Example 1 at 95° C., followed by cooling at 1° C./min. After the liquid crystal injection, the cells were heated to 110° C., gradually cooled at a rate of 0.1° C./min. to 90° C., and then left standing for cooling to room temperature, to prepare 11 types of SLMs including SLM Samples S1–S3 using Compounds (1)–(3), respectively, as charge-transporting substances and Comparative SLM Sample CS1 using Compound (4) as a charge-transporting substance.

Then, the above-prepared SLM samples were exposed, in a system as shown in FIG. 12A, to laser light (infrared rays having a wavelength of 780 nm) emitted from a semiconductor laser 60 and optical fiber 61 and transmitted through a mask 62 having an image pattern as shown in FIG. 12B. A DC voltage of 40 [volts] was applied between the transparent electrodes of each SLM sample to effect data writing. The laser light exposure density was 0.5 $\mu J/cm^2$.

Then, each sample SLM after the exposure was disposed between a pair of polarizers 30 and 31 arranged in cross nicols and illuminated with readout light $L_R$. As a result, SLMs including substrate samples S21–S28 provided display images as shown in FIG. 12D at a good contrast, while the displayed images caused a negative-positive inversion by changing the direction of the polarizers 30 and 31. On the other hand, Comparative SLM Samples including comparative substrate samples CS21–CS23 provided display image with unclearly reproduced dot peripheries.

EXAMPLE 8

An SLM was prepared in the following manner.

Two glass substrates were respectively provided with a transparent electrode by sputtering and patterning of an ITO film.

Then, one substrate was coated by spin coating with a dispersion liquid formed by dispersing 4 wt. parts of 4,10-diboromoanthanthrone, 2 wt. parts of benzal resin (Mw= 24000) and 34 wt. parts of cyclohexane together with 1 mm-dia. glass beads for 20 hours in a sand mill, followed by dilution with 60 wt. parts of butanol. Thereafter, the coating layer was dried at 80° C. for 15 min. to form a 0.65 $\mu$m-thick charge generation layer.

Then, 10 wt. parts of a compound of the structural formula shown below and 10 wt. parts of bisphenol Z-type polycarbonate (Mw=39000) were dissolved in a mixture solvent of 80 wt. parts of dichloromethane and 80 wt. parts of monochlorobenzene to form a solution, which was then applied by spin coating onto the above-prepared charge generation layer, and dried at 120° C. for 10 min. to form a 0.025 $\mu$m-thick charge transport layer. The thus-formed substrate sample (S29) exhibited a capacitance ratio ($C_{CTL}/C_{CGL}$) of 17.75.

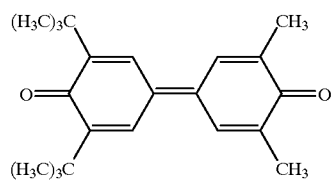

By using the thus-prepared substrate sample (S29) otherwise in the same manner as in Example 7, an SLM was prepared. The thus-prepared SLM was supplied with a DC voltage of 50 [volts] and was exposed, in a system as shown in FIG. 12A, to visible laser light having a wavelength of 670 nm) emitted from a semiconductor laser 60 and optical fiber 61 and transmitted through a mask 62 having an image pattern as shown in FIG. 12B to effect character image writing.

Then, the SLM was disposed between a pair of polarizers 30 and 31 arranged in cross nicols and illuminated with readout light $L_R$. As a result, the SLM provided a display image at a very good dot reproducibility, while the displayed image caused a negative-positive inversion by changing the direction of the polarizers 30 and 31.

As described above, according to this embodiment using a function separation-type photoconductor layer exhibiting an avalanche effect, a high-resolution data writing becomes possible based on a liquid crystal orientation state change caused by a photo-current flowing through the photoconductor layer at the time of photo-illumination. As a result, if it is combined with a writing light emission apparatus allowing a digital image processing scheme, it becomes possible to effect high-resolution data writing at an excellent dot reproducibility.

In the above, embodiments of using substrates having thereon a non-divided transparent electrode have been described, but the present invention is also suitably applicable to a liquid crystal device including a pair of substrates each having thereon a plurality of electrodes, e.g., stripe-shaped electrodes so as to form an electrode matrix suitable for multiplexing drive, and having thereon a uniaxial alignment film and a non-rubbed photoelectric conversion layer, and a liquid crystal disposed between the substrates. Moreover, according to the present invention, a liquid crystal device capable of containing a liquid crystal arranged in a bookshelf layer structure with little alignment defect and providing excellent display quality can be produced inexpensively.

What is claimed is:

1. A liquid crystal device comprising a pair of transparent substrates disposed with a prescribed gap therebetween and each having a transparent electrode thereon, a photoelectric conversion semiconductor layer not subjected to rubbing formed on one of the pair of transparent substrates, an alignment film subjected to rubbing formed on the other of the pair of transparent substrates, and a liquid crystal disposed between the photoelectric conversion semiconductor layer and the alignment film, wherein said photoelectric conversion semiconductor layer has a surface energy of at most 30 dyn/$cm^2$.

2. A liquid crystal device according to claim 1, wherein said photoelectric conversion layer has a laminate structure including a layer containing a charge-generating substance and a layer containing a charge-transporting substance.

3. A liquid crystal device according to claim 1, wherein said photoelectric conversion layer comprises a single layer containing both a charge-generating substance and a charge-transporting substance.

4. A liquid crystal device according to claim 1, wherein said liquid crystal is a chiral smectic liquid crystal.

5. A liquid crystal device according to claim 4, wherein said liquid crystal has a phase transition series not including cholesteric phase and is aligned in a bookshelf layer structure.

6. A liquid crystal device according to claim 1, wherein said photoelectric conversion semiconductor layer has a photo-memory characteristic satisfying a condition of:

$0.1 \leq |V_M/V_D| \leq 1.0$ for $A \times T \geq 1 \times 10^4$ [lux.sec], wherein A [lux]: illumination light intensity, T [sec]: illumination time, $V_D$ [V]: a potential at a non-illuminated portion of the photoelectric conversion semiconductor layer, and $V_M$ [V]: a potential difference between a non-illuminated portion and an illuminated portion of the photoelectric conversion semiconductor layer.

7. A liquid crystal device according to claim 6, wherein said photoelectric conversion semiconductor layer contains an organic charge-generating substance, and an organic charge-transporting substance.

8. A liquid crystal device according to claim 6, wherein said photoelectric conversion layer has a laminate structure including a layer containing a charge-generating substance and a layer containing a charge-transporting substance.

9. A liquid crystal device according to claim 6, wherein said photoelectric conversion layer comprises a single layer containing both a charge-generating substance and a charge-transporting substance.

10. A liquid crystal device according to claim 6, wherein an intermediate layer is disposed between the electrode and the photoelectric conversion semiconductor layer.

11. A liquid crystal device according to claim 6, wherein a color filter layer is disposed between the pair of transparent substrates.

12. A liquid crystal device according to claim 6, wherein said liquid crystal is a ferroelectric liquid crystal.

13. A liquid crystal device according to claim 1, wherein said photoelectric conversion semiconductor layer includes a charge generation layer having a capacitance $C_{CGL}$ and a charge transport layer having a capacitance $C_{CTL}$ providing a ratio $C_{CTL}/C_{CGL}$ of at least 1.0.

14. A liquid crystal device according to claim 13, wherein the ratio $C_{CTL}/C_{CGL}$ is at least 2.5.

15. A liquid crystal device according to claim 14, wherein the ratio $C_{CTL}/C_{CGL}$ is at least 5.0.

16. A liquid crystal device according to claim 13, wherein an intermediate layer is disposed between the transparent electrode and the photoelectric conversion semiconductor layer.

17. A liquid crystal device according to claim 13, wherein said charge generation layer contains an azo pigment represented by the following formula:

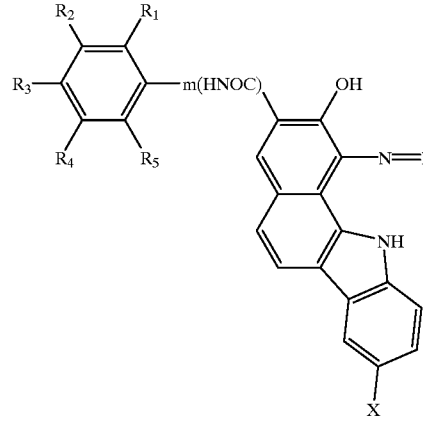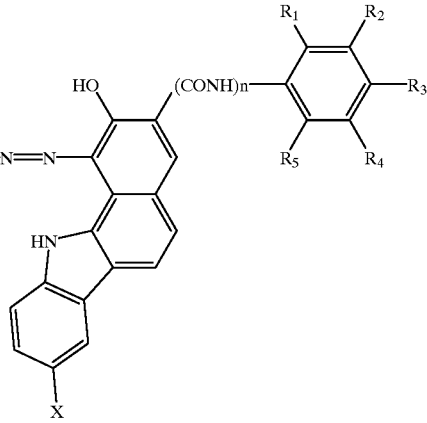

wherein X denotes a hydrogen atom or a halogen atom; $R_1$, $R_2$, $R_3$, $R_4$ and $R_5$ independently denote a hydrogen atom, a fluorine atom, nitro group, cyano group; or alkyl group; alkoxy group; aralkyl group; aryl group or alkylamino group, each capable of having a substituent; m and n independently denote 1 or 2.

18. A liquid crystal device according to claim 13, wherein a color filter layer is disposed between the pair of transparent substrates.

19. A liquid crystal device according to claim 13, wherein said liquid crystal is a ferroelectric liquid crystal.

20. A liquid crystal device according to claim 1, wherein said photoelectric conversion semiconductor layer provides a photo-attenuation curve giving a differential coefficient (Δ potential/Δ light quantity)-light quantity curve showing a maximum of the differential coefficient.

21. A liquid crystal device according to claim 20, wherein the maximum of the differential coefficient given by a normalized photo-attenuation curve is at least 3.

22. A liquid crystal device according to claim 20, wherein said photoelectric conversion layer contains an organic charge-generating substance and an organic charge-transporting substance.

23. A liquid crystal device according to claim 20, wherein said photoelectric conversion layer has a laminate structure including a layer containing a charge-generating substance and a layer containing a charge-transporting substance.

24. A liquid crystal device according to claim 20, wherein said photoelectric conversion semiconductor layer comprises a single layer containing a charge-generating substance alone, or both a charge-generating substance and a charge-transporting substance.

25. A liquid crystal device according to claim 20, wherein an intermediate layer is disposed between the electrode and the photoelectric conversion semiconductor layer.

26. A liquid crystal device according to claim 20, wherein a color filter layer is disposed between the pair of transparent substrates.

27. A liquid crystal device according to claim 20, wherein said liquid crystal is a ferroelectric liquid crystal.

28. A liquid crystal device, comprising a pair of substrates each having an electrode and a liquid crystal-contacting layer thereon, and a liquid crystal disposed between the substrates, wherein the liquid crystal-contacting layer on one substrate comprises a charge-transporting photoconductor semiconductor layer not subjected to rubbing, the liquid crystal-contacting layer on the other substrate comprises a uniaxial alignment film and said charge-transporting photoconductor semiconductor layer has a surface energy of at most 30 dyn/cm$^2$.

29. A liquid crystal device according to claim 28, wherein said liquid crystal is a chiral smectic liquid crystal having a phase transition series not including cholesteric phase.

30. A liquid crystal device according to claim 28, wherein said liquid crystal is placed in a chiral smectic phase exhibiting a bookshelf layer structure.

31. A liquid crystal device according to claim 28, wherein the photoconductive semiconductor layer has not been subjected to rubbing.

32. A liquid crystal device according to claim 28, wherein the photoconductive semiconductor layer comprises an organic semiconductor.

33. A liquid crystal device according to claim 28, wherein said uniaxial alignment film has been subjected to rubbing.

34. A liquid crystal device according to claim 28, wherein a charge generation layer is disposed between the electrode and the photoconductive semiconductor layer.

35. A liquid crystal device according to claim 28, wherein the photoconductive semiconductor layer comprises an organic conductor layer not subjected to rubbing, the liquid crystal is a chiral smectic liquid crystal having a phase transition series not including cholesteric phase and is aligned in a bookshelf layer structure, and said uniaxial alignment film comprises a rubbed polyimide film.

36. A liquid crystal device, comprising a pair of substrates each having a liquid crystal-contacting layer thereon, and a liquid crystal disposed between the substrates, wherein the liquid crystal-contacting layer on one substrate comprises an organic photoelectric conversion semiconductor layer not subjected to rubbing, the liquid crystal-contacting layer on the other substrate comprises a uniaxial alignment film, the liquid crystal is a chiral smectic liquid crystal aligned in a bookshelf layer structure, and said organic photoelectric conversion semiconductor layer has a surface energy of at most 30 dyn/cm$^2$.

37. A process for producing a liquid crystal device, comprising the steps of:

providing a pair of transparent substrates respectively with a transparent electrode, forming a photoelectric conversion semiconductor layer free from rubbing on one transparent substrate, forming and rubbing an alignment film on the other transparent substrate, applying said one and the other transparent substrates to each other while leaving a gap therebetween, and injecting a liquid crystal into the gap between the pair of transparent substrates, wherein said photoelectric conversion semiconductor layer has a surface energy of at most 30 dyn/cm$^2$.

38. A process for producing a liquid crystal device, comprising the steps of:

providing a pair of transparent substrates respectively with a transparent electrode, forming an organic photoelectric conversion semiconductor layer free from rubbing on one transparent substrate;

forming and rubbing an alignment film on the other transparent substrate, disposing a spacer-forming curable resin on the organic photoelectric conversion semiconductor layer, applying the pair of substrates to each other while leaving a gap therebetween, curing said spacer-forming curable resin, and injecting a liquid crystal into the gap between the pair of transparent substrates, wherein said organic photoelectric conversion semiconductor layer has a surface energy of at most 30 dyn/cm$^2$.

* * * * *

UNITED STATES PATENT AND TRADEMARK OFFICE
CERTIFICATE OF CORRECTION

PATENT NO.    : 6,233,027 B1
DATED         : May 15, 2001
INVENTOR(S)   : Akira Unno et al.

It is certified that error appears in the above-identified patent and that said Letters Patent is hereby corrected as shown below:

Title page,
Item [56] References Cited, under FOREIGN PATENT DOCUMENTS, "03275723" should read -- 3-275723 --; and
Item [57] ABSTRACT,
Line 7, "an" should read -- and --.

Column 1,
Line 42, "and a heat treatment at a temperature" should be deleted; and
Line 51, "are" should read -- is --.

Column 2,
Line 5, "as" should read -- to be --.

Column 5,
Line 8, "transmissive. The" should read -- transmissive, the --.

Column 7,
Line 6, "a" should be deleted; and
Line 32, "$\mu$-thick" should read -- "$\mu$m-thick --.

Column 8,
Line 17, "readout" should read -- read out --.

Column 12,
Line 15, "$d_{CTL}$" should read -- $d_{CTL})$ --; and
Line 43, "field" should read -- filed --.

Column 13,
Line 11, "in the" should be deleted;
Line 45, "forma" should read -- form a --; and
Line 66, "a" should read -- as --.

UNITED STATES PATENT AND TRADEMARK OFFICE
CERTIFICATE OF CORRECTION

PATENT NO. : 6,233,027 B1
DATED : May 15, 2001
INVENTOR(S) : Akira Unno et al.

It is certified that error appears in the above-identified patent and that said Letters Patent is hereby corrected as shown below:

Column 17,
Line 63, "than" should read -- with respect to --.

Column 18,
Line 40, "H$_O$\" should read -- HO\ --.

Column 20,
Line 19, "cased" should read -- that used in --;
Line 20, "on" should be deleted; and
Line 66, "followed" should read -- followed by --.

Column 23,
Line 15, "*TIOPC:" should read -- *TiOPC: --.

Column 24,
Line 12, "Figure" should read -- FIG. 15 --; and
Line 27, "an" should read -- and --.

Column 25,
Line 36, "z-200" should read -- Z-200; and
Line 56, "H$_O$\" should read -- HO\ --.

Column 26,
Line 34, "giving a" should read -- giving a maximum --; and
Line 36, "exhibiting a maximum," should read -- ) exhibiting a --.

Column 27,
Line 37, "pats" should read -- parts --; and
Line 39, "four" should read -- coating --.

UNITED STATES PATENT AND TRADEMARK OFFICE
CERTIFICATE OF CORRECTION

PATENT NO. : 6,233,027 B1
DATED : May 15, 2001
INVENTOR(S) : Akira Unno et al.

It is certified that error appears in the above-identified patent and that said Letters Patent is hereby corrected as shown below:

<u>Column 32,</u>
Line 67, "film" should read -- film, --.

Signed and Sealed this

Twenty-sixth Day of February, 2002

*Attest:*

*Attesting Officer*

JAMES E. ROGAN
*Director of the United States Patent and Trademark Office*